(12) United States Patent
Wallis

(10) Patent No.: US 9,888,781 B2
(45) Date of Patent: Feb. 13, 2018

(54) EXTENDIBLE SOFA

(71) Applicant: FLEXSTEEL INDUSTRIES, INC., Dubuque, IA (US)

(72) Inventor: David E. Wallis, Dubuque, IA (US)

(73) Assignee: FLEXSTEEL INDUSTRIES, INC., Dubuque, IA (US)

(*) Notice: Subject to any disclaimer, the term of this patent is extended or adjusted under 35 U.S.C. 154(b) by 31 days.

(21) Appl. No.: 14/954,829

(22) Filed: Nov. 30, 2015

(65) Prior Publication Data
US 2016/0150887 A1 Jun. 2, 2016

Related U.S. Application Data

(60) Provisional application No. 62/085,978, filed on Dec. 1, 2014.

(51) Int. Cl.
| | |
|---|---|
| *A47C 7/00* | (2006.01) |
| *A47C 17/04* | (2006.01) |
| *B60N 2/00* | (2006.01) |
| *B60N 2/02* | (2006.01) |
| *B60N 2/30* | (2006.01) |
| *B60N 2/34* | (2006.01) |
| *B60P 3/39* | (2006.01) |

(52) U.S. Cl.
CPC ............... *A47C 17/04* (2013.01); *B60N 2/00* (2013.01); *B60N 2/0224* (2013.01); *B60N 2/3011* (2013.01); *B60N 2/3059* (2013.01); *B60N 2/34* (2013.01); *B60N 2002/0236* (2013.01); *B60N 2002/0288* (2013.01); *B60P 3/39* (2013.01)

(58) Field of Classification Search
CPC ...... A47C 17/04; A47C 7/024; A61G 5/1062; B60N 2/3081; B60N 2/3086; B60N 2002/0288
USPC .... 297/233, 236, 235, 452.4, 452.63, 283.2, 297/314, 340, 123, 257, 344.1, 350, 351
See application file for complete search history.

(56) References Cited

U.S. PATENT DOCUMENTS

| | | | | |
|---|---|---|---|---|
| 243,775 A | * | 7/1881 | Hatch | A47C 4/20 297/107 |
| 371,091 A | * | 10/1887 | Miller | B60N 2/3084 182/223 |
| 455,933 A | * | 7/1891 | Timmons | A47C 7/024 297/233 |
| 779,718 A | * | 1/1905 | Kline | B60N 2/3086 297/236 |
| 1,335,973 A | * | 4/1920 | Kesselman | A47C 1/023 297/107 |

(Continued)

*Primary Examiner* — Jose V Chen
(74) *Attorney, Agent, or Firm* — Ladas & Parry LLP

(57) ABSTRACT

An extendible sofa has a base assembly, a slide out assembly and a seat assembly. The base assembly has a base assembly frame that forms a seat, and the base assembly frame has a guide. The slide-out assembly is slidably connected to the base assembly by way of the guide. The guide facilitates movement of the slide-out assembly between a compact position and an extended position in which the slide-out assembly extends out away from the base assembly to provide additional seating. The slide-out assembly has a seat guide. The seat assembly has a seat frame slidably connected to the seat guide, and the seat guide facilitates movement of the seat assembly between a stowed position in which the seat assembly is housed within the slide-out assembly and a seat position.

15 Claims, 21 Drawing Sheets

(56) References Cited

U.S. PATENT DOCUMENTS

| | | | | |
|---|---|---|---|---|
| 1,530,420 | A * | 3/1925 | Schmitt | A47C 17/13 297/107 |
| 2,187,689 | A * | 1/1940 | Jaray | A47C 17/12 297/107 |
| 2,688,997 | A * | 9/1954 | Miller | A47D 9/02 297/129 |
| 2,696,246 | A * | 12/1954 | Putnam | B60N 2/2854 108/129 |
| 3,057,662 | A * | 10/1962 | Johnson | B61D 31/00 297/283.2 |
| 3,743,351 | A * | 7/1973 | Harris | A47C 17/132 297/107 |
| 3,759,572 | A * | 9/1973 | Koepke | A47C 4/022 297/351 |
| 3,760,744 | A * | 9/1973 | Cruckshank | A47B 45/00 108/102 |
| 3,975,783 | A | 8/1976 | Pringle | |
| 4,045,829 | A | 9/1977 | Pringle | |
| 4,286,525 | A * | 9/1981 | Willmore | A47B 1/08 108/102 |
| 4,442,556 | A | 4/1984 | Craigie | |
| 4,543,675 | A | 10/1985 | Shrock | |
| 4,860,393 | A | 8/1989 | Schefthaler | |
| 5,195,194 | A | 3/1993 | Bradley | |
| 5,528,778 | A | 6/1996 | Shrock | |
| 5,660,436 | A * | 8/1997 | Wilson | A47C 13/00 297/233 |
| 5,673,973 | A * | 10/1997 | Marechal | B60N 2/062 297/257 |
| 5,947,559 | A | 9/1999 | Williams | |
| 5,988,749 | A | 11/1999 | Williams | |
| 6,092,708 | A * | 7/2000 | Rand | B60R 5/045 108/147.21 |
| 6,588,837 | B1 | 7/2003 | Schultz | |
| 6,843,531 | B2 | 1/2005 | Williams | |
| 6,918,143 | B2 | 7/2005 | Wiberg | |
| 7,578,551 | B2 * | 8/2009 | Linero | B64D 11/0693 297/107 |
| 8,387,176 | B2 | 3/2013 | Contreras | |
| 9,359,079 | B2 * | 6/2016 | Scott | B64D 11/0601 |
| 2008/0084104 | A1 * | 4/2008 | VanHorn | A47C 7/546 297/452.4 |
| 2013/0333110 | A1 | 12/2013 | Rodriguez | |

* cited by examiner

EXTENDIBLE SOFA

BACKGROUND OF THE INVENTION

Field of the Invention

The present invention relates generally to a furniture assembly, and more particularly, to an extendible sofa.

Background

Sofas are typically designed to seat a certain amount of people and occupy a given amount of space. A user must determine at the time of purchase whether they wish to choose a larger sofa that provides additional seating at the expense of space or to choose a smaller sofa that provides less seating but occupies less space. When considering that different circumstances call for different seating arrangements, the inflexible nature of sofas can create problems.

One example of where different circumstances call for different seating arrangements is the case of the recreational vehicle (RV). RVs are a popular choice for leisure activities such as vacations and camping. The RV provides both the means of travel and the living space. However, the desired seating arrangement for travel may be very different from the desired seating arrangement when the RV is parked, especially when considering that RVs often include a slide-out function that allows an area of the RV to be expanded outwards to increase the amount of living space.

BRIEF SUMMARY OF THE INVENTION

Embodiments of the present invention include an extendible sofa that can be converted between a compact position that occupies less space and an extended position that provides additional seating. Thus, in the RV example, the extendible sofa can provide a suitable seating space both when the RV is moving and when the RV is parked and extended to provide additional living space.

In an embodiment, an extendible sofa comprises a base assembly, a slide out assembly and a seat assembly. The base assembly has a base assembly frame that forms a seat, and a longitudinal guide groove is formed in the base assembly. The slide-out assembly comprises a slide out frame which is housed within the base assembly in a compact position. The slide out assembly can be extended to an extended position in which the slide out assembly extends out away from the base assembly to provide additional seating. The slide out assembly includes a seat guide. The seat assembly comprises a seat frame slidably connected to the seat guide. The seat guide facilitates movement of the seat assembly between a stowed position in which the seat assembly is housed within the slide-out assembly and a seat position. A seat back frame may be pivotally or separably connected to the seat frame.

In another embodiment, an extendible sofa comprises a base assembly, a slide out assembly and a seat assembly. The base assembly comprises a base assembly frame with two opposing longitudinal frame sections, and each of the two opposing longitudinal frame sections has a sliding section in which a longitudinal guide groove is formed. The longitudinal guide grooves extend along the two opposing longitudinal frame sections. Two opposing side frame sections connect the longitudinal frame sections to each other. The slide out assembly is connected to the base assembly by way of the longitudinal guide grooves. The slide out assembly comprises a slide out frame and left and right side panels attached to the slide out frame. Each of the left and right side panels includes a pair of seat guides. The seat assembly is slidably connected to the pair of seat guides of the left and right side panels. The longitudinal guide grooves facilitate movement of the slide-out assembly between a compact position in which the slide-out assembly is housed within the base assembly and an extended position in which the slide-out assembly extends out away from the base assembly to provide additional seating. The pair of seat guides of the left and right side panels are sized and shaped to facilitate movement of the seat assembly between a stowed position in which the seat assembly is housed within the slide-out assembly and a seat position.

In another embodiment, an extendible sofa includes a base assembly, a slide out assembly and a seat assembly. The base assembly has a base assembly frame that forms a seat, and the base assembly frame includes a guide. The slide out assembly is slidably connected to the base assembly by way of the guide, and the slide-out assembly includes a seat guide. The seat assembly is slidably connected to the seat guide, and the seat assembly includes a seat frame. The longitudinal guide groove facilitates movement of the slide-out assembly between a compact position in which the slide-out assembly is housed within the base assembly and an extended position in which the slide-out assembly extends out away from the base assembly to provide additional seating. The seat guide facilitates movement of the seat assembly between a stowed position in which the seat assembly is housed within the slide-out assembly and a seat position. The extendible sofa may also include a slide drive motor which moves the slide-out assembly along the longitudinal guide groove from the compact position to the extended position, and a seat drive motor which moves the seat assembly along the seat guide from the stowed position to the seat position. The extendible sofa may also include first through third switches. The first switch provides power to the seat drive motor when the slide-out assembly reaches the extended position. The second switch prevents the slide out assembly from moving from the extended position to the compact position when the seat assembly is in the seat position. The third switch cuts off power to the slide drive motor and the seat drive motor when the seat back frame is fully pivoted away from the seat frame.

Numerous other features and advantages of the present invention will be readily apparent to those of ordinary skill in the art upon reading of the following detailed description of illustrative embodiments of the present invention when taken in conjunction with the accompany drawings. In this respect, before explaining embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Before undertaking the detailed description of the invention below, it may be advantageous to set forth definitions of certain words and phrases used throughout this patent document. Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. Furthermore, a person skilled in the art of reading claimed inventions should understand that "a" and "an" each generally denotes "at least one," but does not exclude a plurality unless the contextual use dictates otherwise. And that the term "or" denotes "at least one of the items," but does not exclude a plurality of items of the list.

Those skilled in the art will appreciate that the invention described herein is susceptible to variations and modifications other than those specifically described. It is to be understood that the invention includes all such variations and modification which fall within its spirit and scope.

BRIEF DESCRIPTION OF THE FIGURES (NON-LIMITING EMBODIMENTS OF THE DISCLOSURE)

DETAILED DESCRIPTION

Embodiments of the present invention include an extendible sofa with a base section and an extension section. The extendible sofa can be placed in a compact position or an extended position. When in the extended position, the extendible sofa provides additional seating. When in the compact position, the seat assembly of the extension section is stowed within the slide out assembly of the extension section, and the slide out section is stowed within the base frame of base section. Thus, a user can provide additional seating while also having the convenience of being able to stow the additional seating within a space occupied by the sofa itself.

Figure 1:
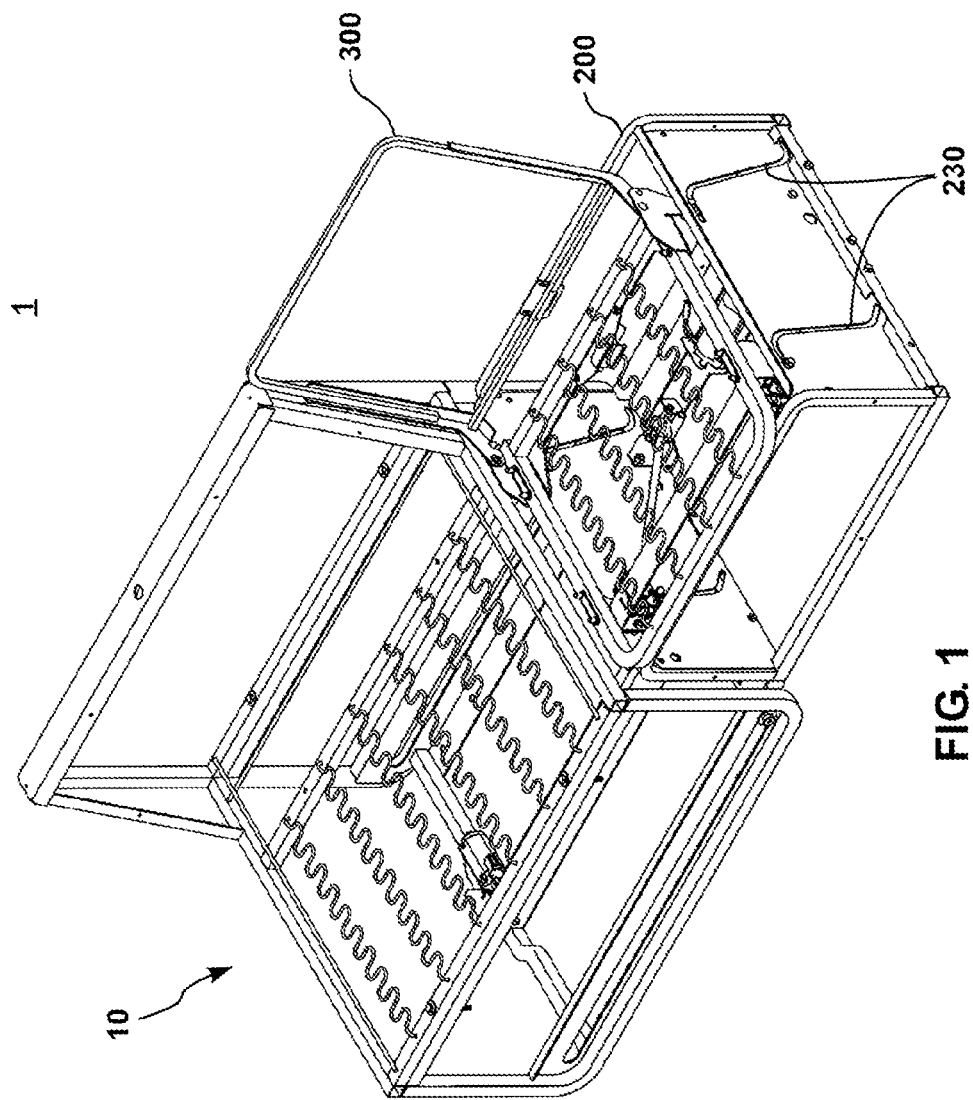
FIG. 1 is a perspective view of an extendible sofa according to an embodiment of the present invention.
Figure 2:
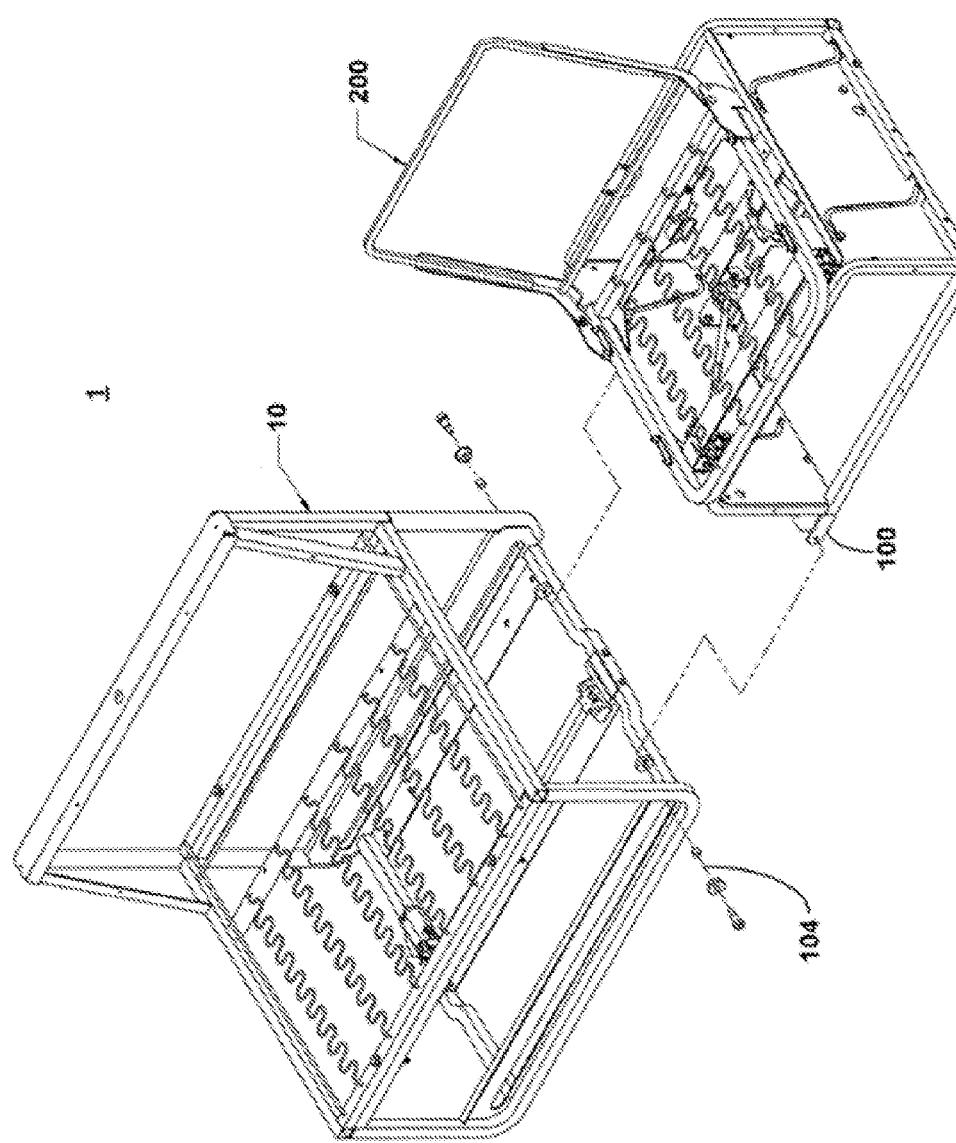
FIG. 2 is an exploded perspective view showing connection of the base assembly to the slide assembly in an extendible sofa according to an embodiment of the present invention.
Figure 3:
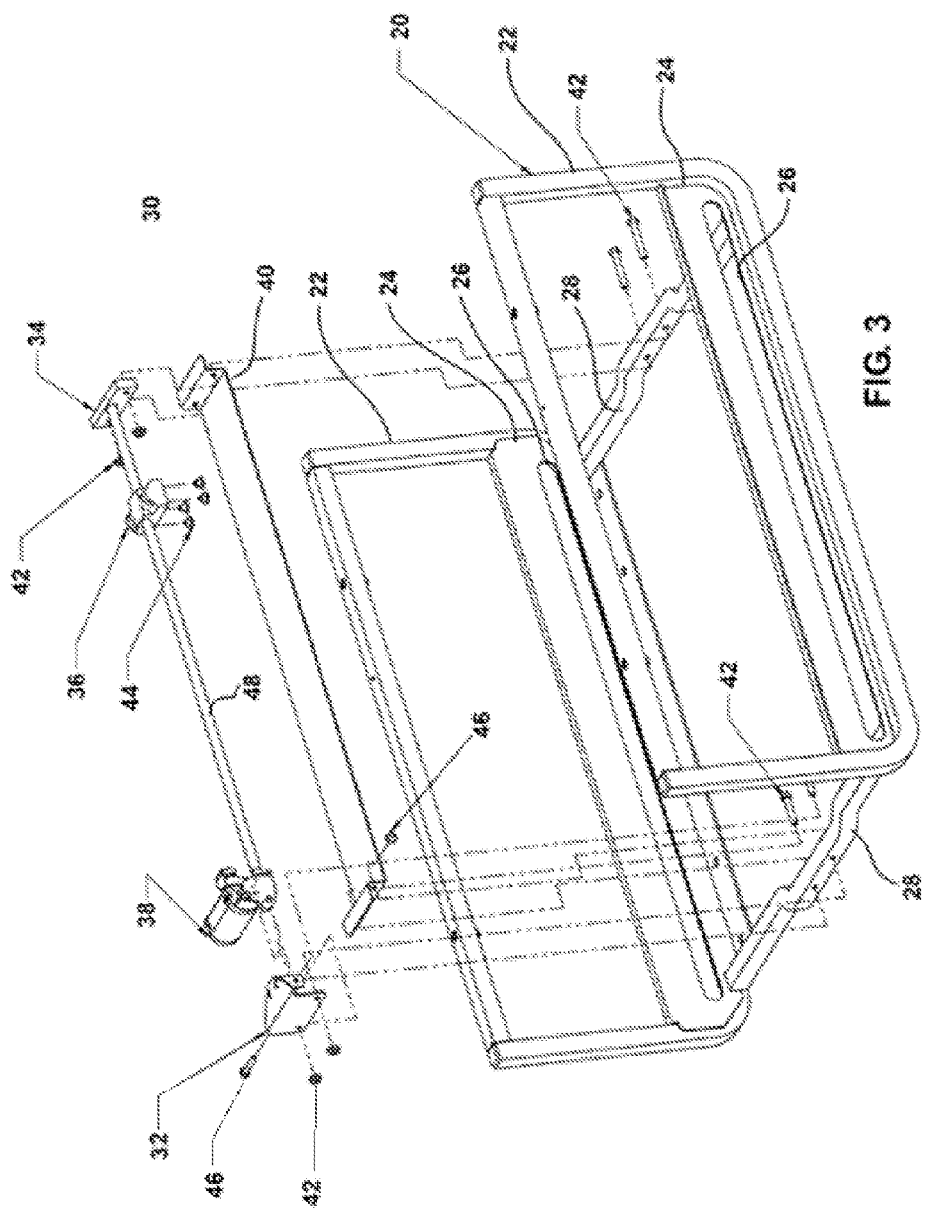
FIG. 3 is an exploded perspective view of the lower base frame of an extendible sofa according to an embodiment of the present invention.
Figure 4:
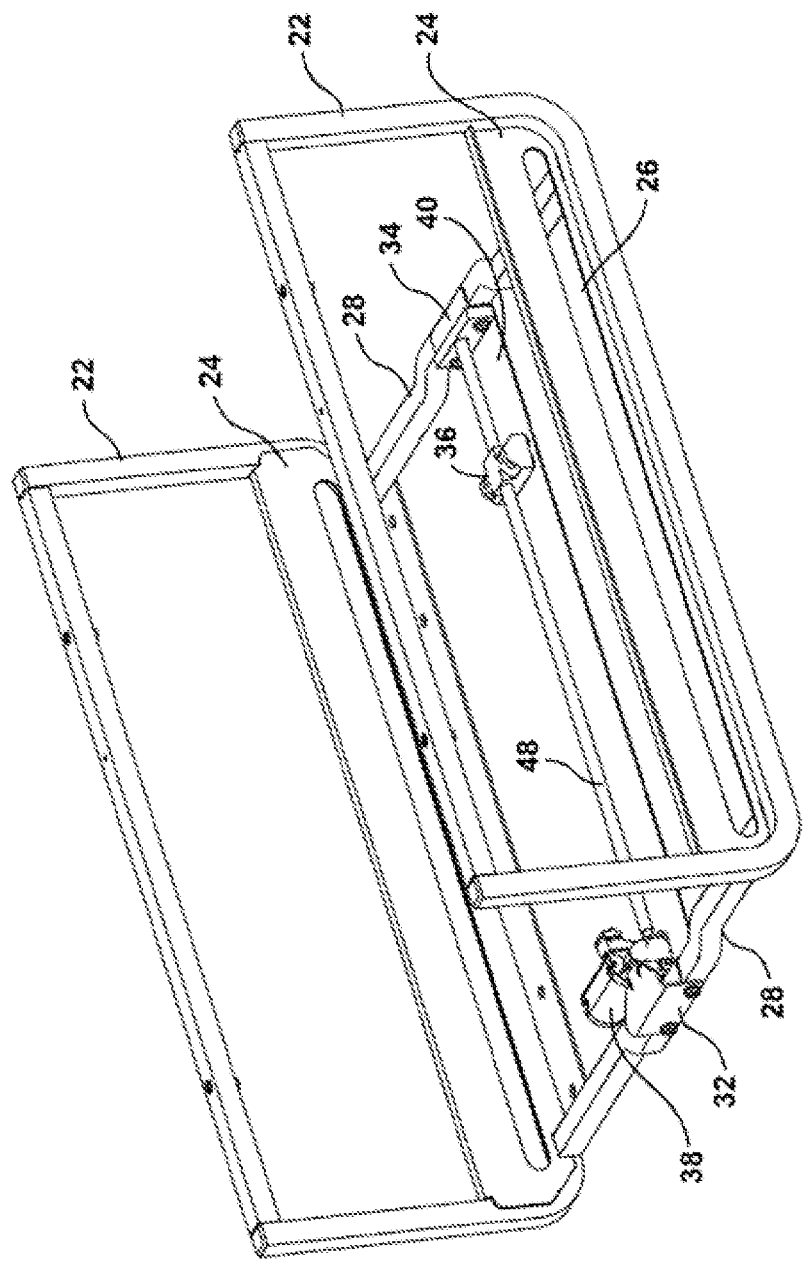
FIG. 4 is a perspective view of the lower base frame of an extendible sofa according to an embodiment of the present invention.

Referring to FIGS. 1 and 2, in an embodiment, the base section of the extendible sofa 1 includes a base assembly 10 and the extension section includes a stowable slide out assembly 200 and a seat assembly 300. The seat assembly 300 folds to a closed position and is then moved along guides 230 to a stowed position. With the seat assembly 300 in the stowed position, the slide out assembly 200 can be housed within the base assembly 10 (i.e., the compact position) or can be extended out away from the base assembly 10 (i.e., the extended position). For example, referring to FIG. 20, in the compact position the footprint of the extendible sofa is smaller. Thus, if, for example, the extendible sofa 1 is used in a recreational vehicle (RV), a user can use the extendible sofa 1 in the compact position when it is desired that the sofa 1 take up less space. When referring to FIGS. 21 to 23, the extendible sofa can be placed in the extended position when the user desires additional seating and/or has additional freed up space in the RV. Thus, for example, if the RV has an extendible section that can be extended when the RV is parked, the user can take advantage of the extra living space by extending the extendible sofa 1 to add additional seating.

FIGS. 1-5 show the base assembly 10 according to an embodiment of the present invention. In the embodiment shown in FIGS. 1-5, base assembly 10 includes a lower base frame 20 and an upper base frame 50 that form a space on which a user can sit. Lower base frame 20 includes two opposing longitudinal frame sections 22 and two opposing side frame sections 28 that connect the longitudinal frame sections 22 to each other.

The base assembly 10 includes a guide 26 for facilitating movement of the slide out assembly 200 between the compact position in which the slide-out assembly is housed within the base assembly and an extended position in which the slide out assembly extends away from the base assembly to provide additional seating. In the embodiment shown in FIGS. 1-5, the guide 26 is formed as longitudinal guide grooves 26 formed in sliding sections 24 of the lower base frame. As will be described in more detail below, longitudinal guide grooves 26 guide the movement of the slide out assembly 200 during conversion of the extendible sofa 1 between the compact position and extended position.

In an embodiment, the extendible sofa 1 further includes a slide out drive motor 30. The slide out drive motor 30 is a motorized device that extends or contracts the slide out assembly 200 in order to convert the extendible sofa 1 from the compact position to the extended position or from the extended position to the compact position. In the embodiment shown in FIGS. 1-5, slide out drive motor 30 includes rear drive support 32, front drive support 34, slide out shaft 48, drive block 36, slide motor drive combination 38, and lower support 40. The rear drive support 32, front drive support 34 and lower support 40 are fastened to the lower base frame 20 by way of fasteners 42; and the slide motor 38 is fastened to the rear drive support by way of fasteners 46. The fasteners 42 and 46 may comprise screw and nut combinations or other suitable fastening mechanisms. In the embodiment shown in FIG. 3, the fasteners 42 are 0.312 inch screws and 0.312 inch nuts and fasteners 46 are 0.250 inch screws and 0.250 inch nuts. In an embodiment, the drive support 34 may be a nylon drive support.

Figure 12:
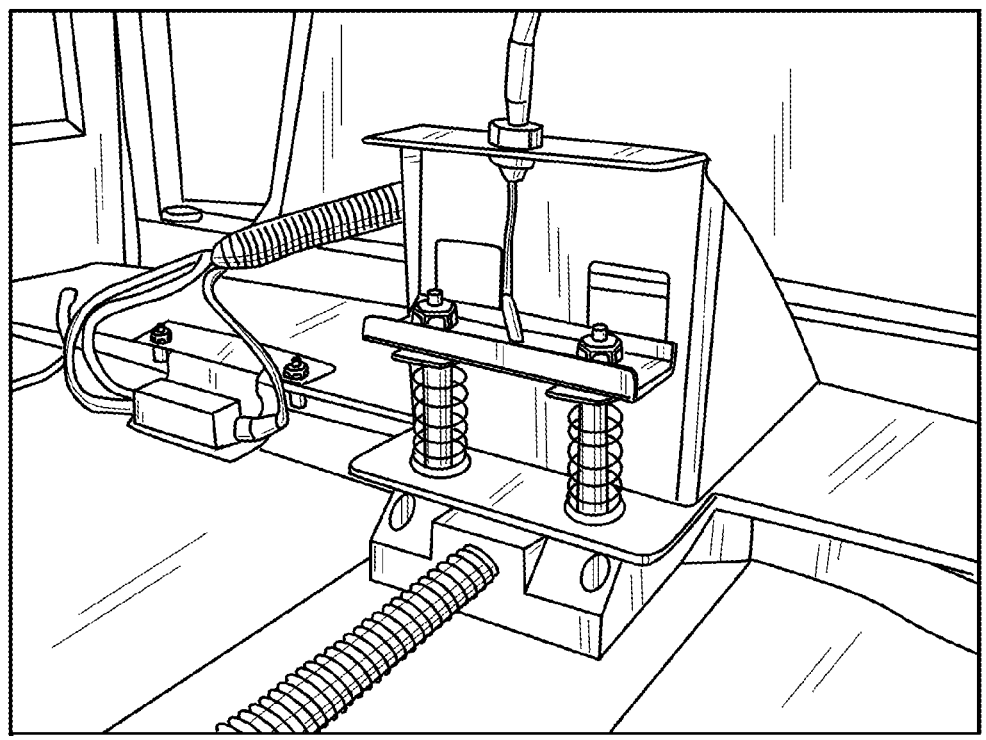
FIG. 12 is a close up view of the drive lock assembly of an extendible sofa according to an embodiment of the present invention.

The slide motor 38 moves the drive block 36 along the slide out shaft 48. As will be described in more detail below, the slide out section 200 is attached to the drive block 36. Thus, the slide out section 200 moves between the compact position and the extended position when the slide motor 38 moves the drive block 36. In an embodiment, the slide out shaft 48 may be a slide out drive screw. A slide out drive screw 48 is depicted in more detail in FIG. 12. The slide motor 38 turns the slide out drive screw 48, which in turn causes the drive block 36 to move.

Lower support 40 provides support for the drive block 36 as it moves along the slide out shaft 48. The drive block 36 may comprise nylon guides 44, which move along the lower support 40 and may or may not contact lower support 40 during movement.

Figure 5:
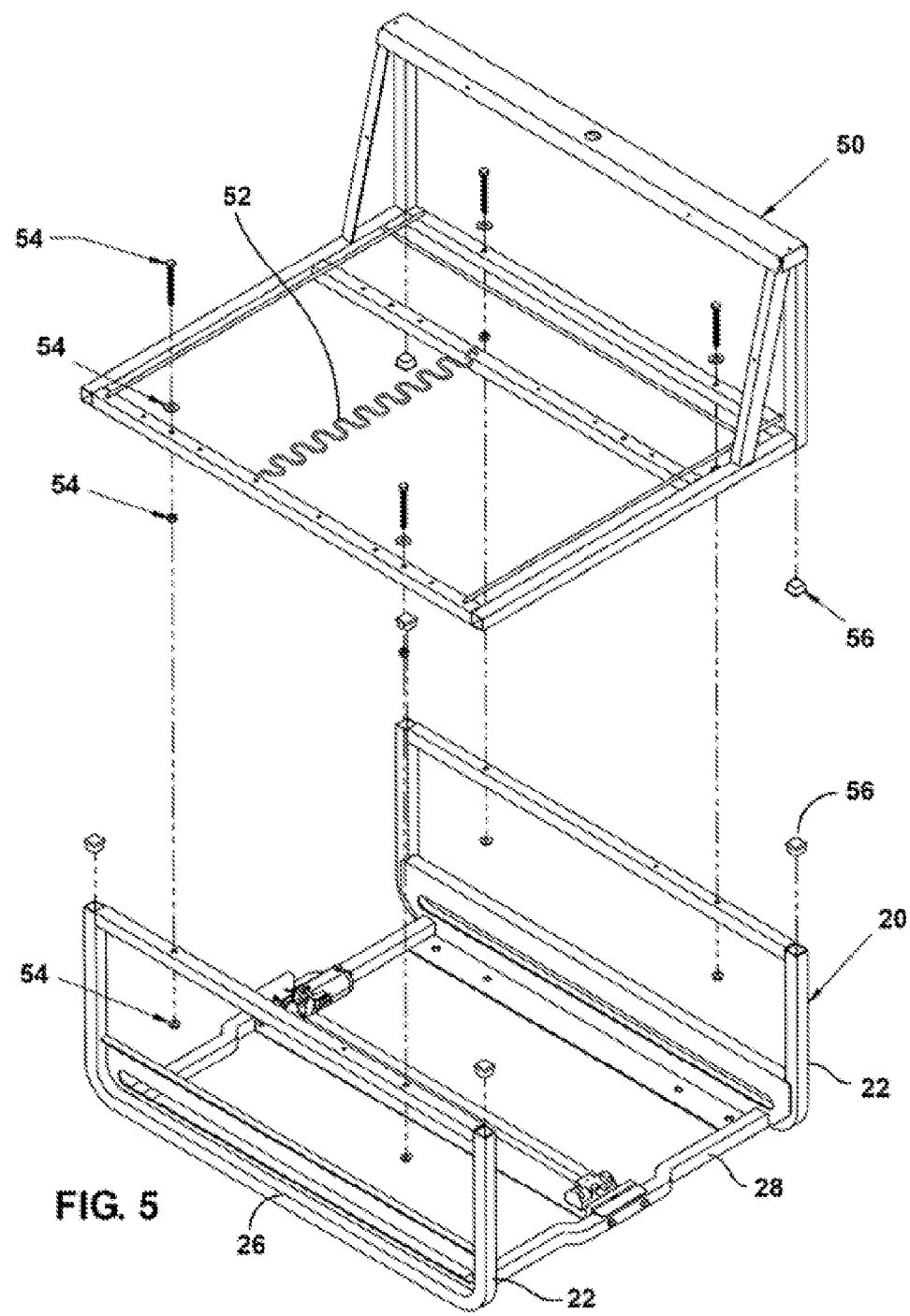
FIG. 5 is an exploded perspective view showing the attachment of the upper base frame to the lower base frame in an extendible sofa according to an embodiment of the present invention.

The upper base frame 50 is connected to the lower base frame by way of upper/lower base frame fasteners 54. In an embodiment, the upper/lower base frame fasteners may be a combination of bolts, washers, lock nuts and washer face nuts. In the particular embodiment shown in FIG. 5, each fastener includes a 0.312 inch bolt, a 0.312 inch washer, a 0.312 inch lock nut and a 0.312 inch washer face nut. The upper and lower base frames 50 and 20 may also utilize tube plugs 56. Tube plugs 56 close up the exposed openings of the hollow upper and lower base frames 50 and 20. Upper base frame 50 also includes springs 52. The springs 52 may be sinuous wire springs, as shown in FIGS. 1, 2 and 5, or other suspension arrangements familiar to one of ordinary skill, such as straps or leaf type springs. When upholstered, the base frame provides a seat on which a user may sit.

FIGS. 1 to 5 show the base assembly according to an embodiment of the present invention in which a slide out drive motor 30 is used to move the slide out assembly 200 between the compact and extended positions. In another embodiment, the slide out drive motor 30 can be omitted. In this embodiment, the slide out section is manually moved along the guide 26 in order to switch the extendible sofa 1 between the compact and extended position. The guide 26 of the base assembly 10 facilitates movement of the slide out assembly between the compact position and the extended position. In the embodiment shown in FIGS. 1 and 2, the guide 26 is formed as longitudinal guide grooves formed in sliding sections on the outside of the base assembly 10. Additional examples of the guide 230 include, but are not limited to, one or more guide rods formed in the center or at sides of the base assembly 10, and a groove formed in the center of the base assembly 10.

Figure 6:
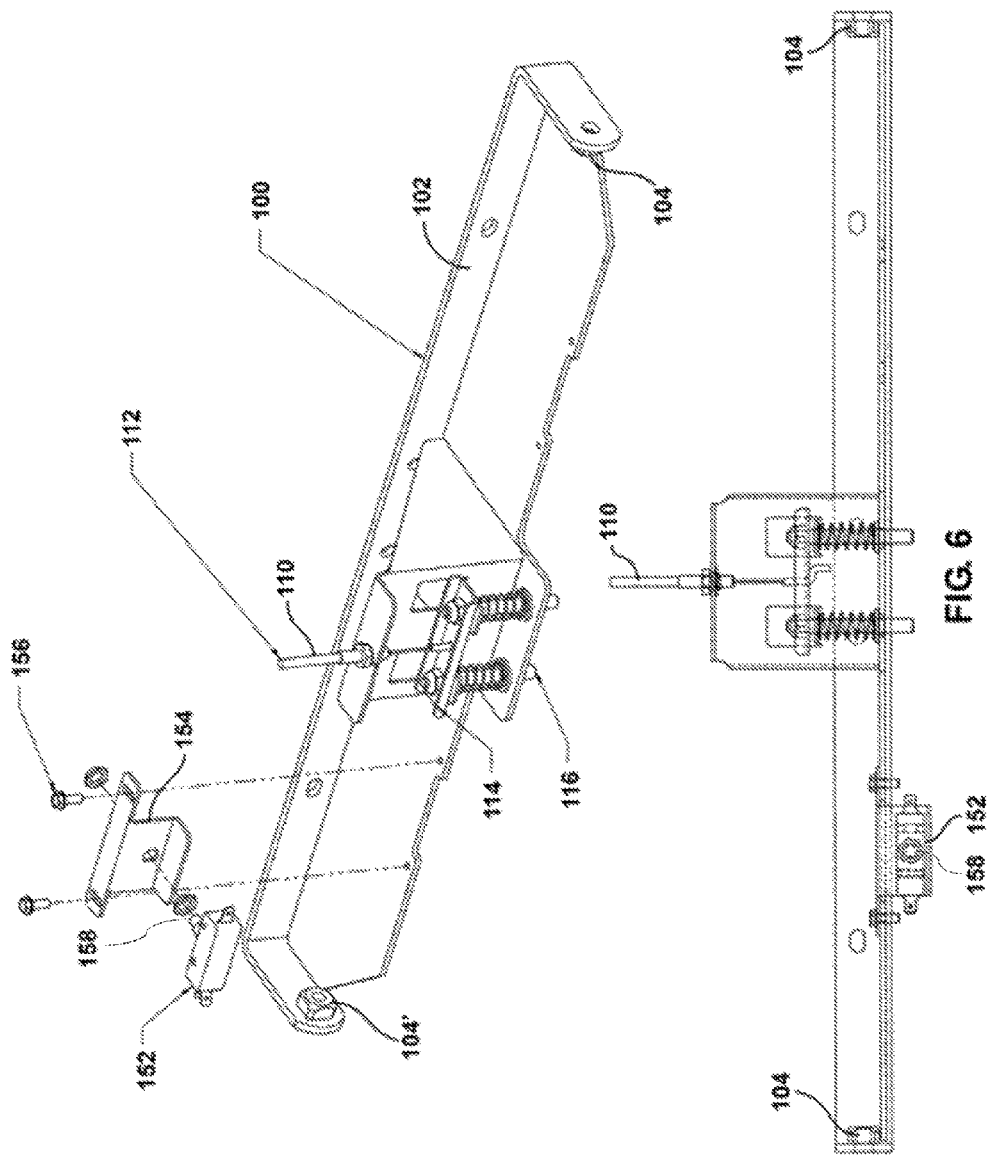
FIG. 6 is an exploded perspective view of the connection assembly of an extendible sofa according to an embodiment of the present invention.
Figure 7:
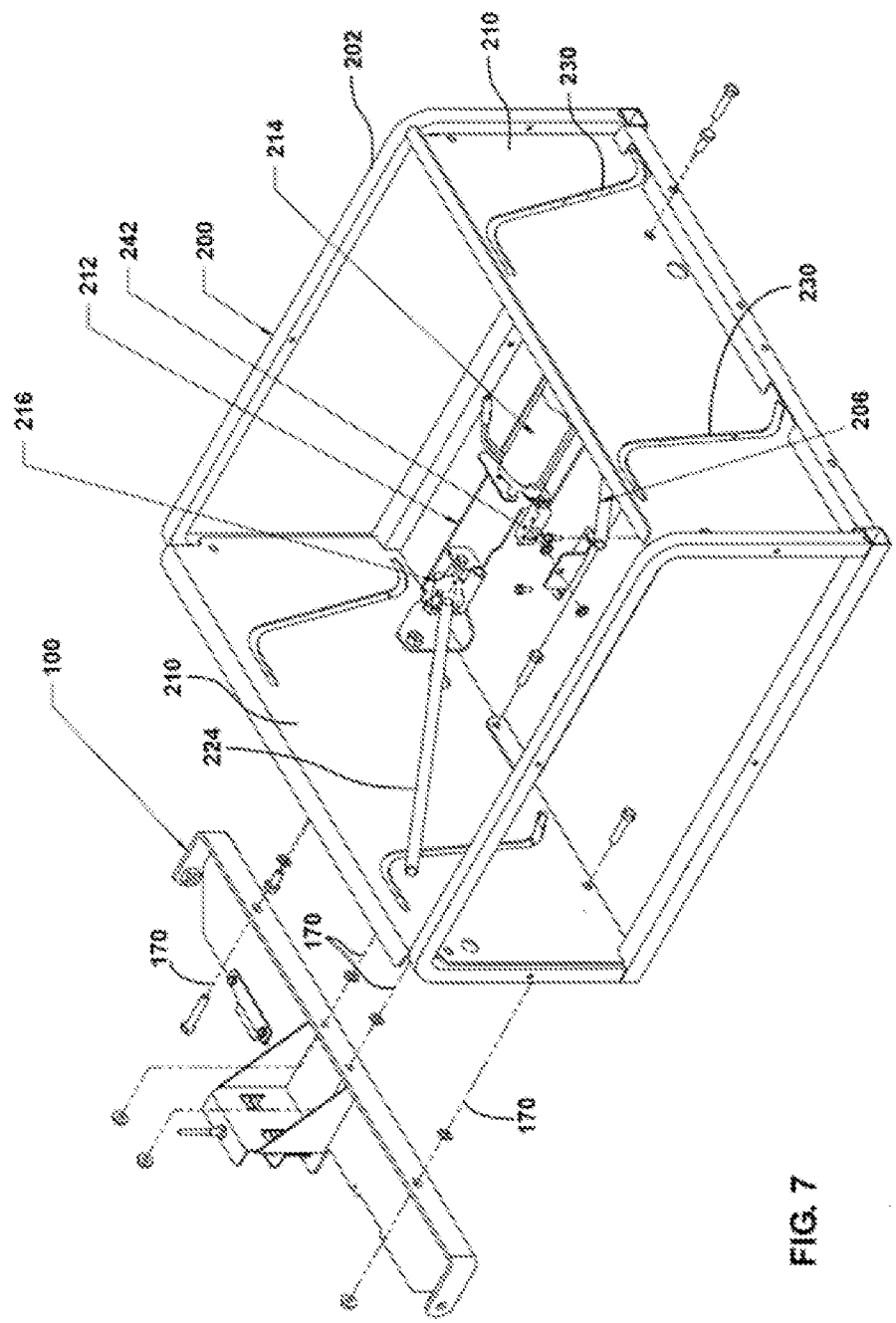
FIG. 7 is an exploded perspective view showing the connection of the connection assembly to the slide out assembly in an extendible sofa according to an embodiment of the present invention.

FIG. 6 is a perspective view of the connection assembly 100 for connecting the slide out assembly 200 to the base assembly 10 according to an embodiment of the present invention. FIGS. 1, 2 and 7 show the connection of the slide out assembly 200 to the base assembly 10 by way of the connection assembly 100. Referring to FIGS. 1, 2, 6 and 7, the connection assembly 100 includes connection frame 102, drive lock assembly 110, and switch assembly. The connection frame 102 includes slidable fasteners 104 for slidably connecting the connection frame 102 to the longitudinal guide grooves 26 of the lower base frame 20. In an embodiment, the connectors may include combinations of spacers, bearings, bushings and shoulder bolts or other suitable known fasteners. In the particular embodiment depicted in FIG. 2, each connector 104 includes a spacer, a nylon bearing, a bushing and a shoulder bolt.

The connection frame 102 of the connection assembly 100 is attached to the slide out assembly 200 by way of connection assembly fasteners 170. In an embodiment, the connection assembly fasteners may include combinations of screws, bolt retainers and nuts, or other suitable known fasteners. In the particular embodiment depicted in FIG. 7, each connection assembly fastener includes a 0.312 inch screw, a 0.312 inch bolt retainer and a 0.312 inch nut.

In an embodiment, the connection assembly further comprises a drive lock assembly 110 for connecting the connection assembly 100 to the drive block 36 of the base assembly 10. In an embodiment, the drive lock assembly 110 includes one or more pins that are inserted into holes in drive block 36. This configuration is also shown in the close-up view depicted in FIG. 12. When the connection assembly 112 is connected to the drive block 36, movement of the drive block 36 caused by the slide motor 38 moves the slide out assembly 200 between the compact and extended positions.

In an embodiment, the drive lock assembly 110 may also include a cable assembly 112 for disengaging the connection assembly 100/slide out assembly 200 from the drive block 36. Cable assembly 112 includes a cable connected to a pin support 114. The one or more lock pins 116 are biased in the locked position by one or more springs 52. The upward movement of the cable forces the lock pins upwards allowing them to be disengaged from the drive block 36. Thus, if there is a power outage or if a user desires to manually move the slide out assembly between the compact and extended positions, the cable assembly can be used to disengage the connection assembly 100/slide out assembly 200 from the drive block 36.

In an embodiment, the connection assembly 100 may also include a switch assembly 150. The switch assembly 150 includes a switch (i.e., first switch) 152 and a switch bracket 154 that is connected to the connection assembly 100 by way of switch fasteners 156. In an embodiment, the switch fasteners may be screws. The switch 152 includes an actuator 158 and is attached to the switch bracket 154. In the embodiment shown in FIGS. 6 and 7 the switch assembly hangs over the bottom of the connection assembly 100. When referring to FIG. 5 as well as FIG. 6, it can be understood that when connection assembly 100 and slide out assembly 200 reach the full extending position, the switch actuator 158 will contact the inner surface of the front side frame section 28. When the switch 152 is activated, the power is shut off to the slide motor 38 and then routed to a seat drive motor 214. The seat drive motor 214 is described in further detail below.

In the embodiments discussed above, the slide out assembly is described as being attached to the base assembly by way of a guide that is part of the base assembly. However, it is conceivable that such a guide could also be part of an RV. For example, the slide out assembly 200 could be slidably attached to the floor of an RV. The slide out assembly 200 could then be extended from the compact position to the extended position by way of the slidable attachment to the RV.

Figure 8:
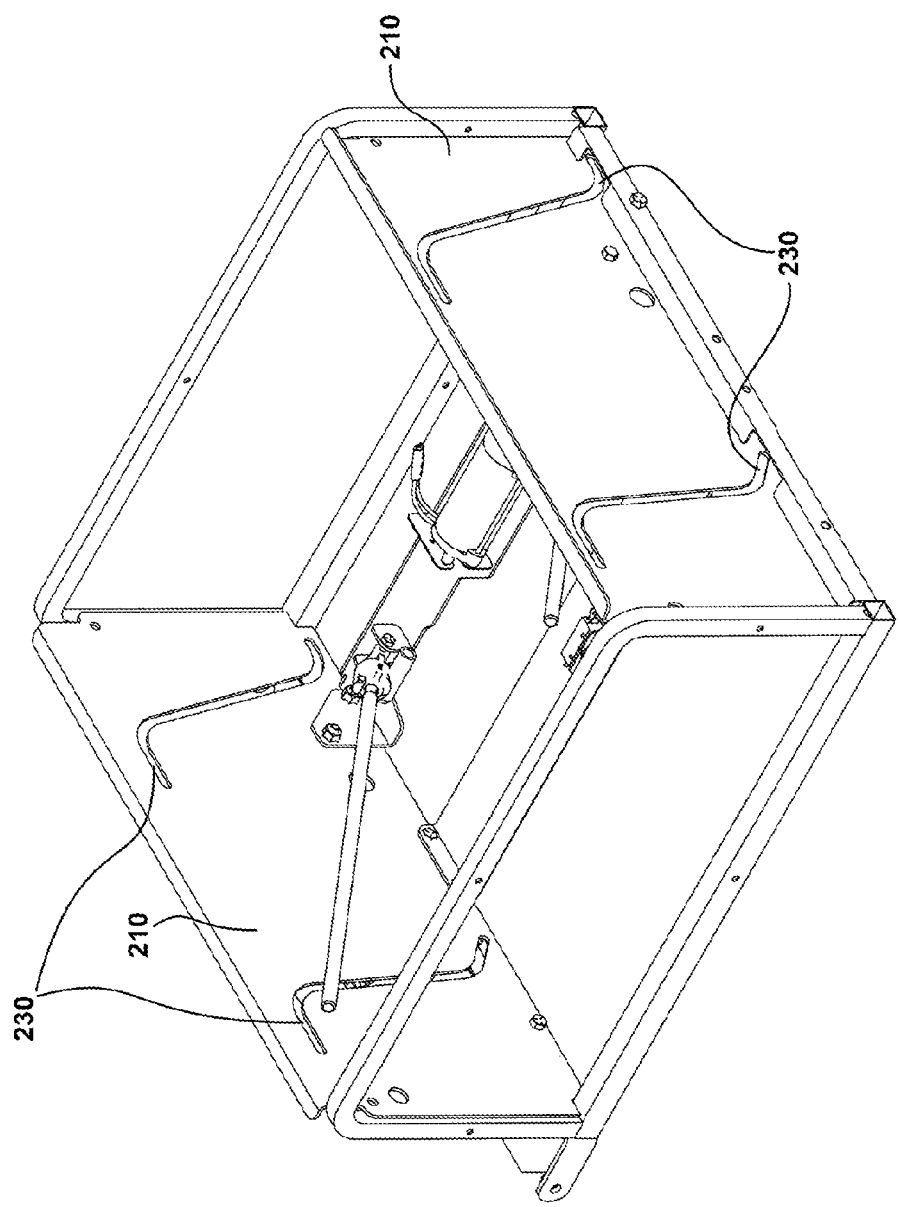
FIG. 8 is a perspective view showing the slide out assembly of an extendible sofa according to an embodiment of the present invention.

FIGS. 7 and 8 are perspective views showing an embodiment of the slide out assembly 200 of the extendible sofa 1. Referring to FIGS. 7 and 8, the slide out assembly 200 includes slide out frame 202, left and right side panels 210, and seat drive motor 228. The left and right side panels 210 are attached to slide out frame 202 and are mirror images of each other.

The slide out assembly 200 includes one or more guides for facilitating movement of the seat assembly between the stowed position and the seat position. In the embodiment shown in FIGS. 7 and 8, the one or more guides 230 are formed as a pair of guide grooves 230 formed in each of the left and right side panels 210. The left and right side panels 210 can be advantageously formed of sheet metal, such as steel in a thickness of about ⅛" which has advantages of economy, strength and ease of formation with well-known mechanical properties. The guides 230 can be cut by laser using computer controlled manufacturing techniques. The guides have a geometric shape enabling the seat assembly 300 to be securely stowed within the frame of the slide out assembly 200 as shown in FIG. 21. The geometric shape of the guides 230 guide the seat assembly upward and outward to the seating position shown in FIG. 11 and FIG. 20.

Figure 13:
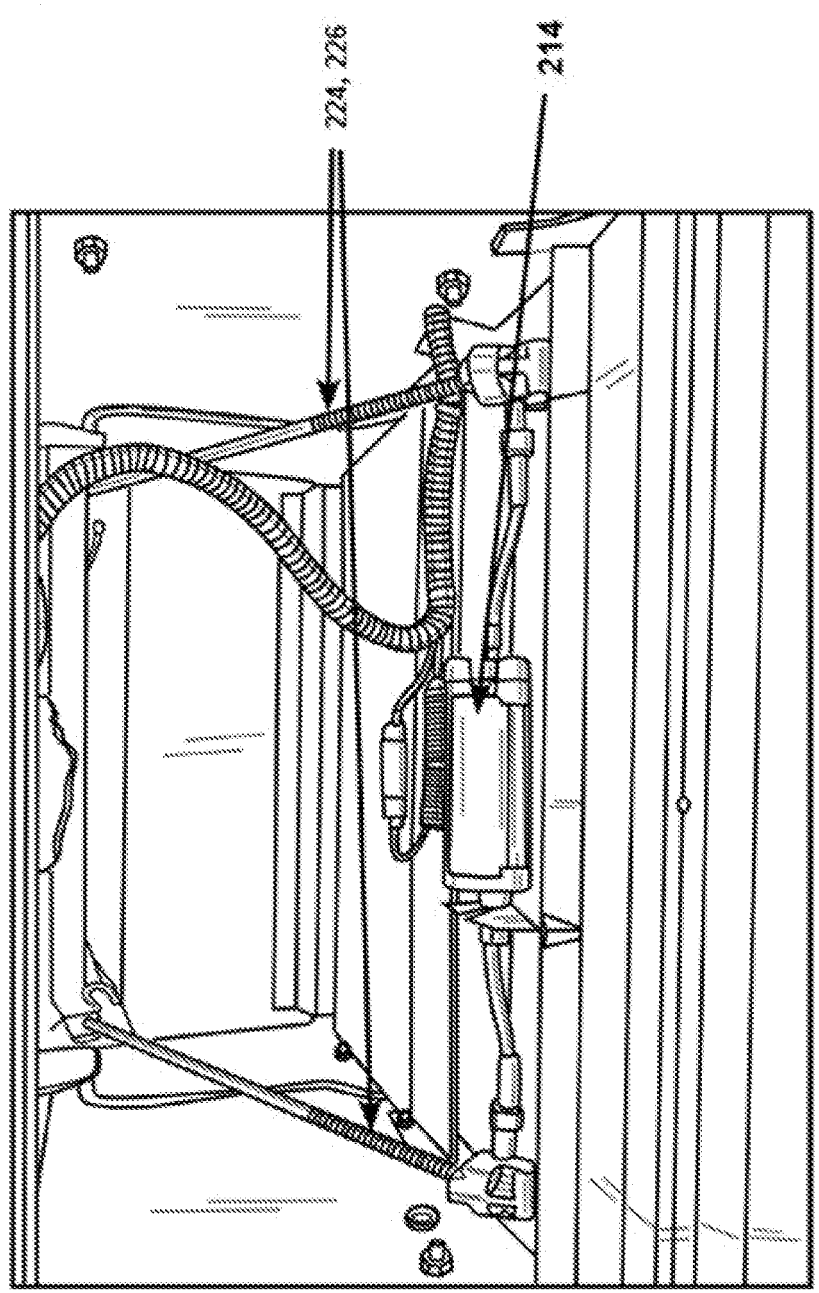
FIG. 13 is a close up view of the seat motor in an extendible sofa according to an embodiment of the present invention.

The seat drive motor 228 moves the seat assembly along the seat guide from the stowed position to the seat position. In the embodiment shown in FIGS. 7 and 8, the seat drive motor 228 includes a seat motor 214, left and right drives 216 and 218 and a seat motor/drive mount 212. The Motor 214 and left and right drives 216, 218 are mounted to the motor/drive mount 212. Motor/drive mount 212 may then be fastened to the left and right side panels 210 by fasteners including, for example a combination of screws, nuts and washers, or another known suitable fastener. In the particular embodiment depicted in FIG. 7, 0.312 inch screws, 0.312 inch nuts and 0.312 inch washers are used. In an embodiment, the right and left drives 216, 218 comprise right and left drive screws, respectively. The seat motor 214 and left and right drive screws are also depicted in FIG. 13.

Figure 16:
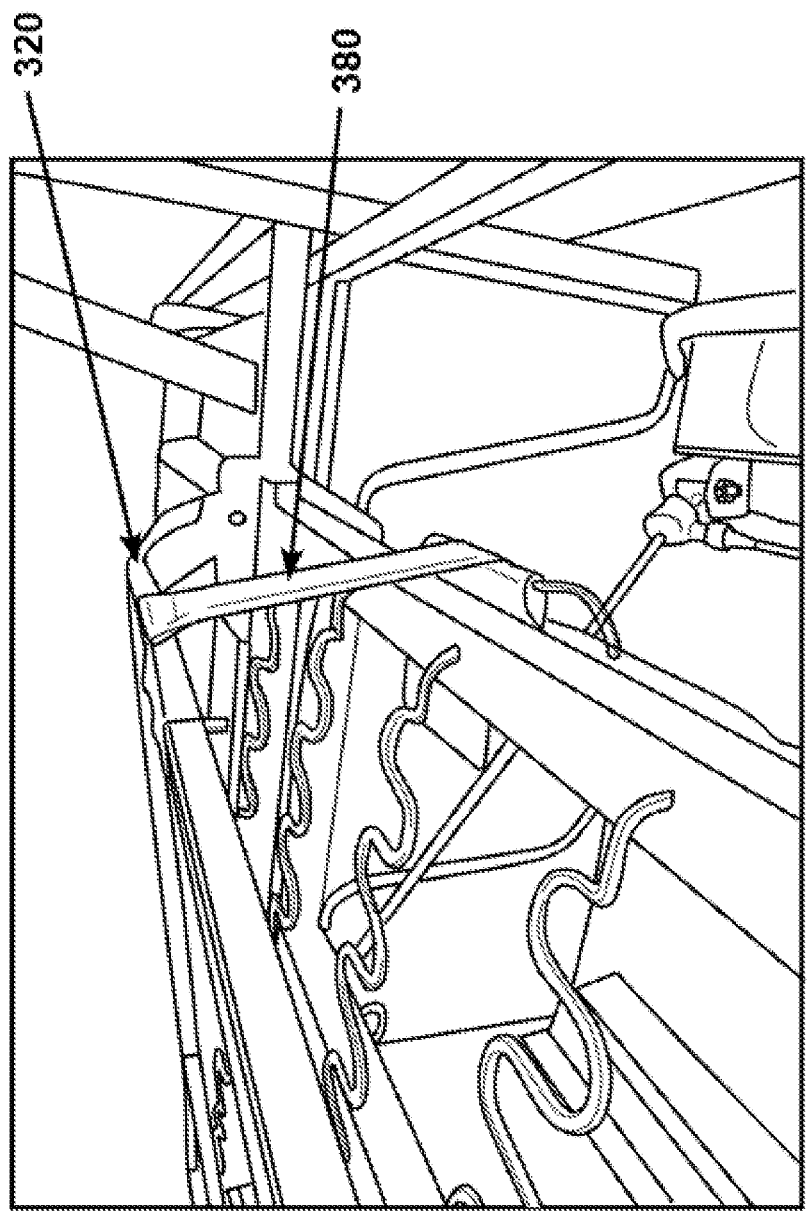
FIG. 16 is a close up view of the seat back switch assembly of an extendible sofa according to an embodiment of the present invention.
Figure 17:
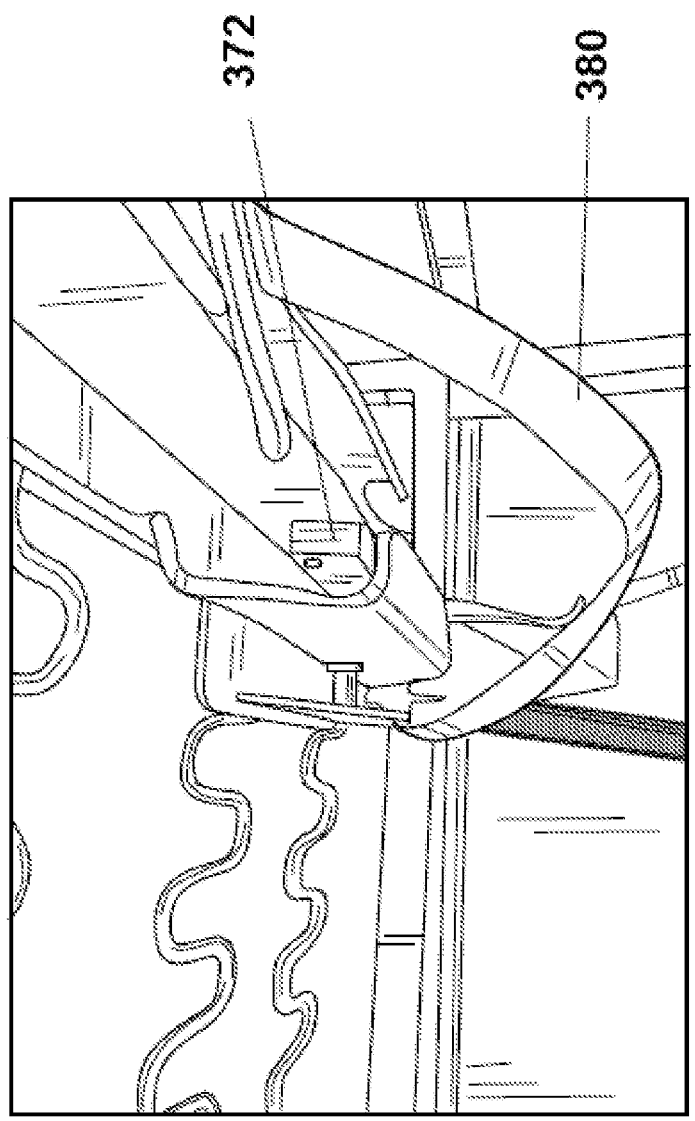
FIG. 17 is a close up view of the seat back switch assembly of an extendible sofa according to an embodiment of the present invention.

In an embodiment, the slide out assembly 200 further comprises a seat switch assembly 240 for preventing the slide out assembly 200 from moving from the extended position to the compact position when the seat assembly 300 is in any position other than the stowed position. The seat switch assembly 240 may include a seat switch (i.e., second switch) 242 with actuator 244, a seat switch bracket 246 and a fastener 248, such as a switch nut, for securing the seat switch 242 to the switch bracket 246. As shown in FIG. 7 and FIG. 16, the actuator extends through a hole in the seat switch bracket. When the seat assembly is in the stowed position, the actuator is pressed so as to close the seat switch 242. The seat switch 242 must be closed in order for the slide motor 38 to operate, which in turn prevents attempts to close the extendible sofa (i.e., move the extendible sofa to the compact position) without the seat assembly being in the stowed position.

Figure 9:
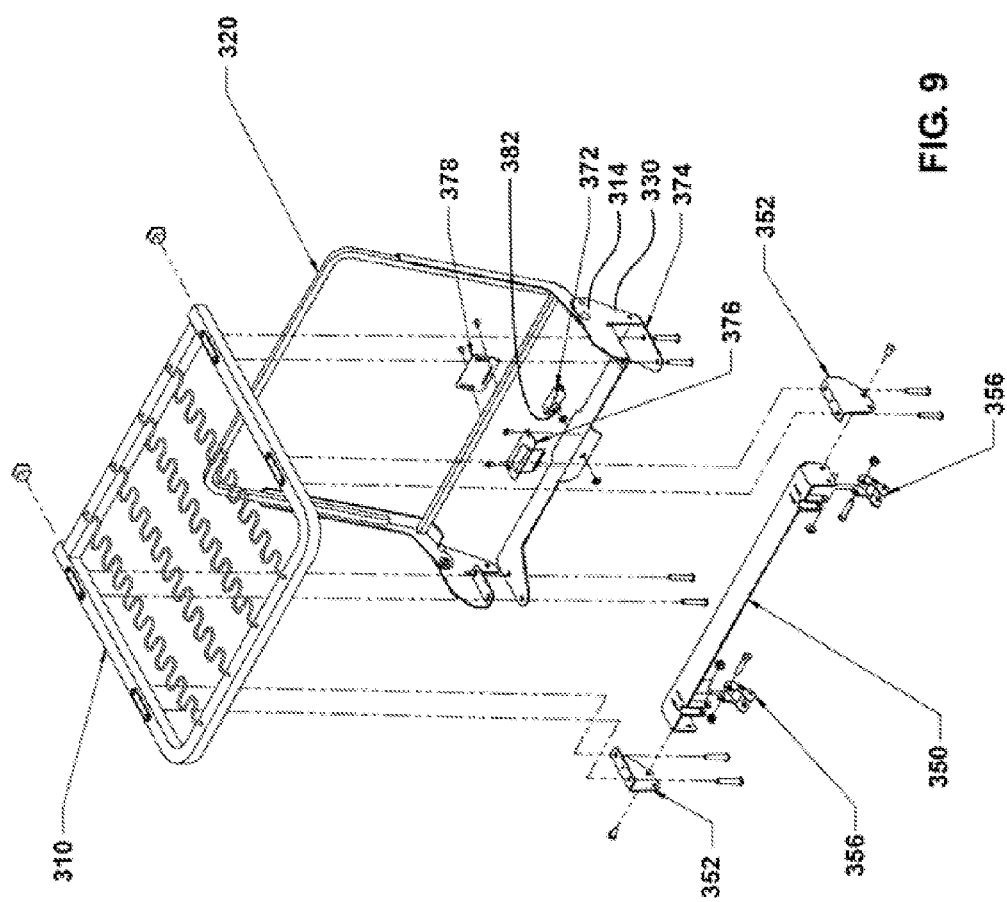
FIG. 9 is an exploded perspective view showing the seat assembly of an extendible sofa according to an embodiment of the present invention.
Figure 10:
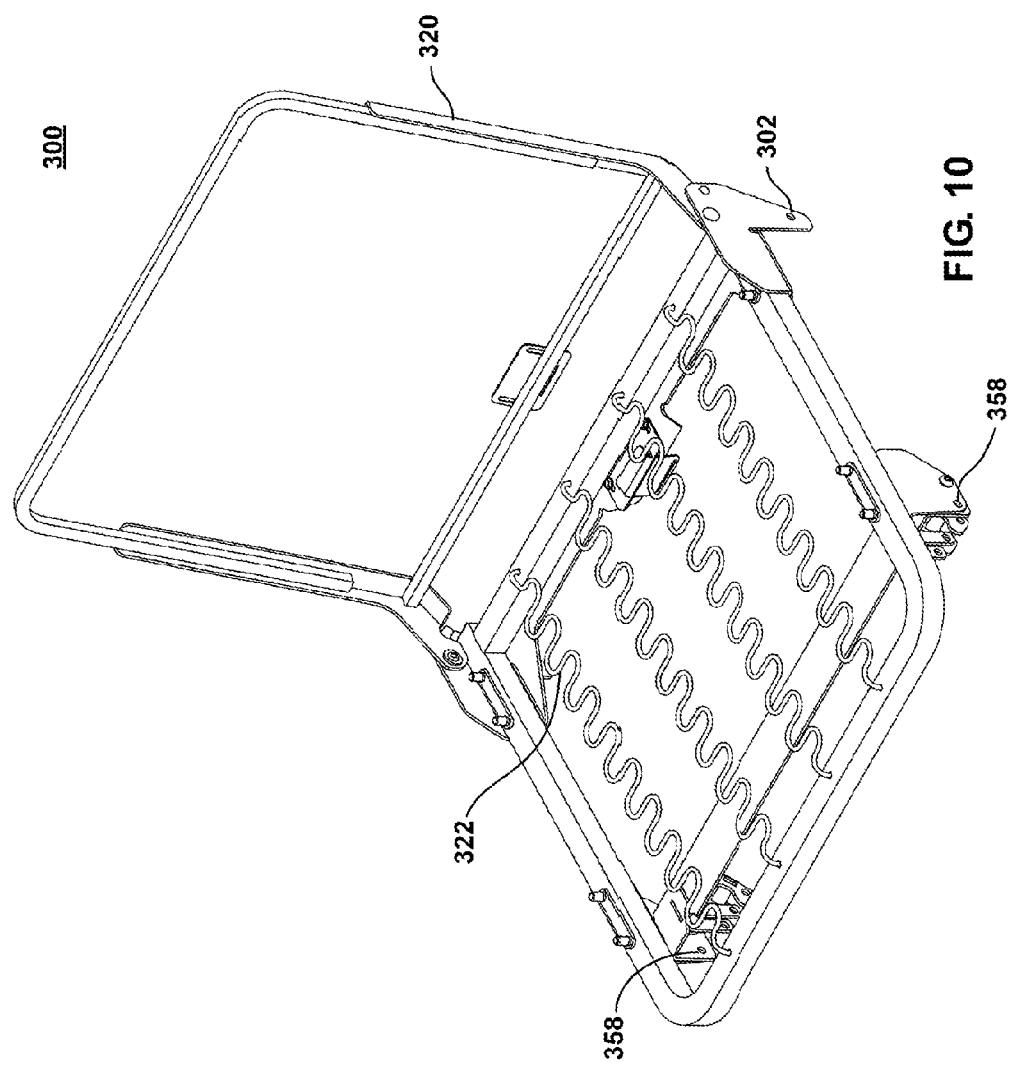
FIG. 10 is a perspective view of the seat assembly of an extendible sofa in the open/up position according to an embodiment of the present invention.
Figure 11:
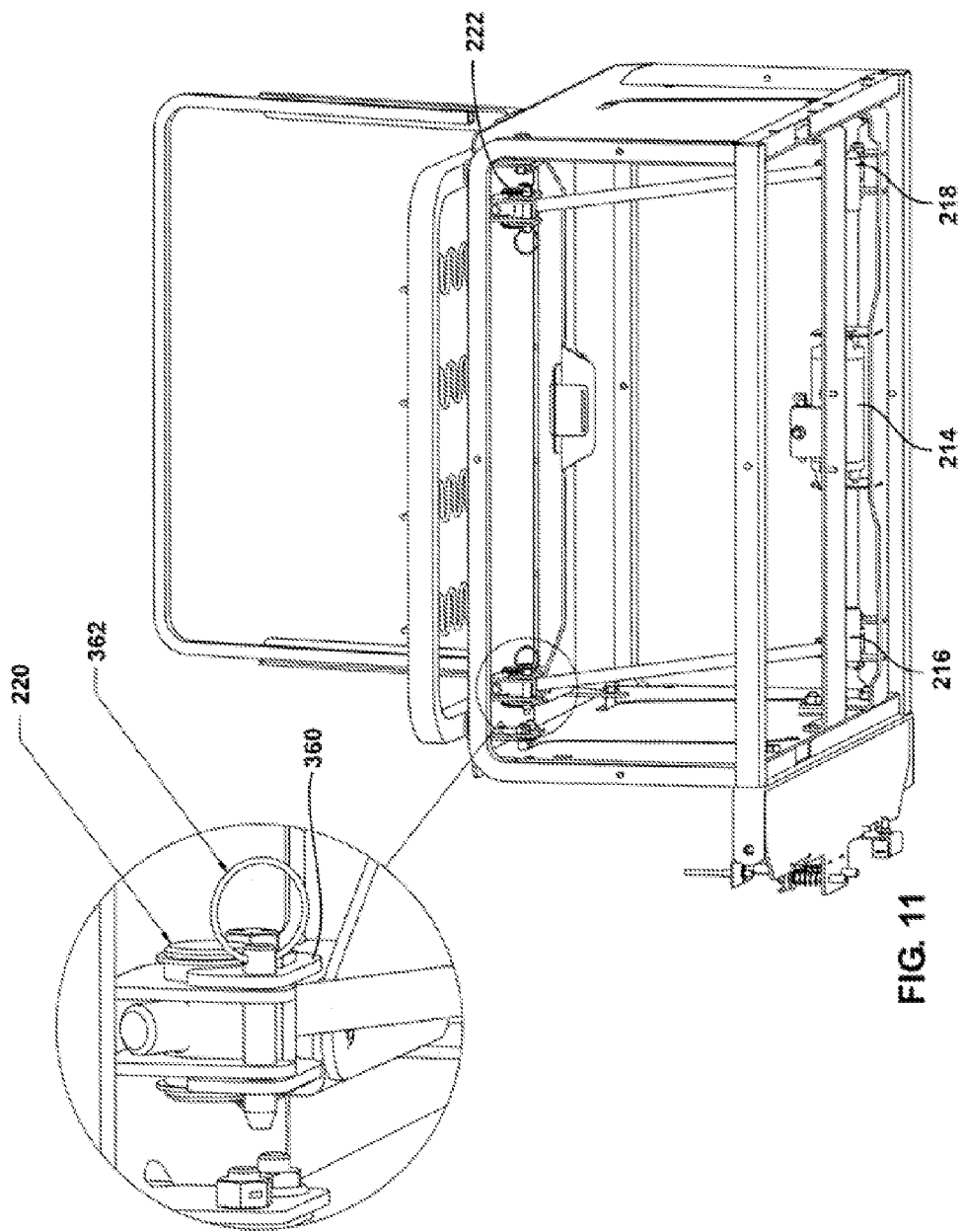
FIG. 11 is a perspective view showing the seat assembly connected to the slide out assembly of an extendible sofa according to an embodiment of the present invention.

FIGS. 9 to 11 show an embodiment of the seat assembly 300 and attachment of the seat assembly 300 to guides 230 and the left and right drives 216 and 218. The seat assembly 300 includes a seat frame 310, back frame 320 and drive block support assembly 350. Seat frame 310 includes springs 312 attached thereto. The springs 312 may be sinuous wire springs, as shown in FIGS. 9-11, or other suspension arrangements familiar to one of ordinary skill, such as straps or leaf type springs. Seat frame 310 is attached to a back end of the back frame 320 by way of seat link members 330. The seat link members each include a first arm with inwardly extending flanges that connect to the seat frame 310, and a second arm that provides back slidable connections 322 for connection to the guides 320 formed in the back end of the left and right side panels 210. In the embodiment shown in FIGS. 9 to 11, the back frame 320 is pivotally connected to pivot connections 314 of seat link members 330. In another embodiment, the back frame 320 may, for example, instead be removably connected. The pivot connections 314 allow the seat frame 320 to pivot back and forth between a closed/stowed position (e.g., FIG. 20) and an open/up position (e.g., FIG. 21). In an embodiment, the seat link members 330 may be attached to the back frame by fasteners such as screws, nuts, washers, or another known suitable connection.

The drive block support assembly 350 attaches to the front end of the seat frame 310 and supports left and right drive blocks 220 and 222. The drive block assembly includes front seat brackets 352, drive block support frame 354 and drive block lock assembly 356. The front seat brackets 352 connect the drive block support frame 354 to the seat frame 310 and also provide front slidable connections 358 for connection to the guides 230 formed in the front end of the left and right side panels 210. Fasteners such as combinations of screws, bolts, nuts, washers, etc. may be used to fasten drive block support frame 354 to the front seat brackets 352 and the front seat brackets 352 to the seat frame 310. Left and right drive blocks 220 and 222 are attached to the drive block support assembly 350 by, for example, the drive block lock assembly 356.

Referring to FIG. 10, the seat assembly 300 includes two front slidable connections 358 and two back slidable connections 322. The front slidable connections 358 are formed on both sides of the drive block support assembly and connect the front end of the seat assembly 300 to the two guides 230 formed in the front end of the left and right side panels 210. The back slidable connections 322 are formed on both sides of the back frame 320 (e.g., in the downwardly extending arm) and slidably connect the back end of the seat assembly 300 to the two guides 230 formed in the back end of the left and right side panels 210. As can be seen when referring to FIGS. 1, 2 and 18-19, the connection of the front slidable connections 358 and the back slidable connections 322 to the guides 230 in the left and right side panels allows the seat assembly 300 to be securely stored within the slide out assembly 200 when in the stowed position and to provide an additional area for sitting when in the seat position.

Figure 14:
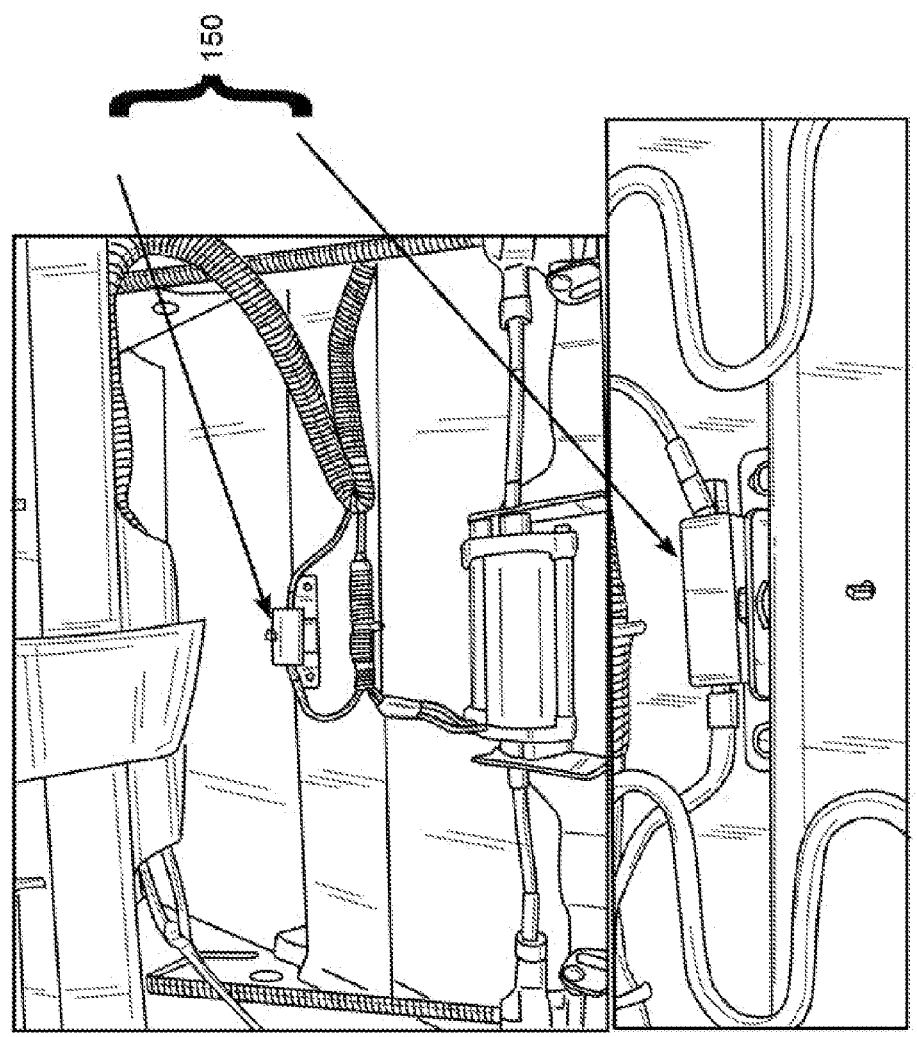
FIG. 14 is a close up view of the switch assembly in the slide out assembly of an extendible sofa according to an embodiment of the present invention.
Figure 15:
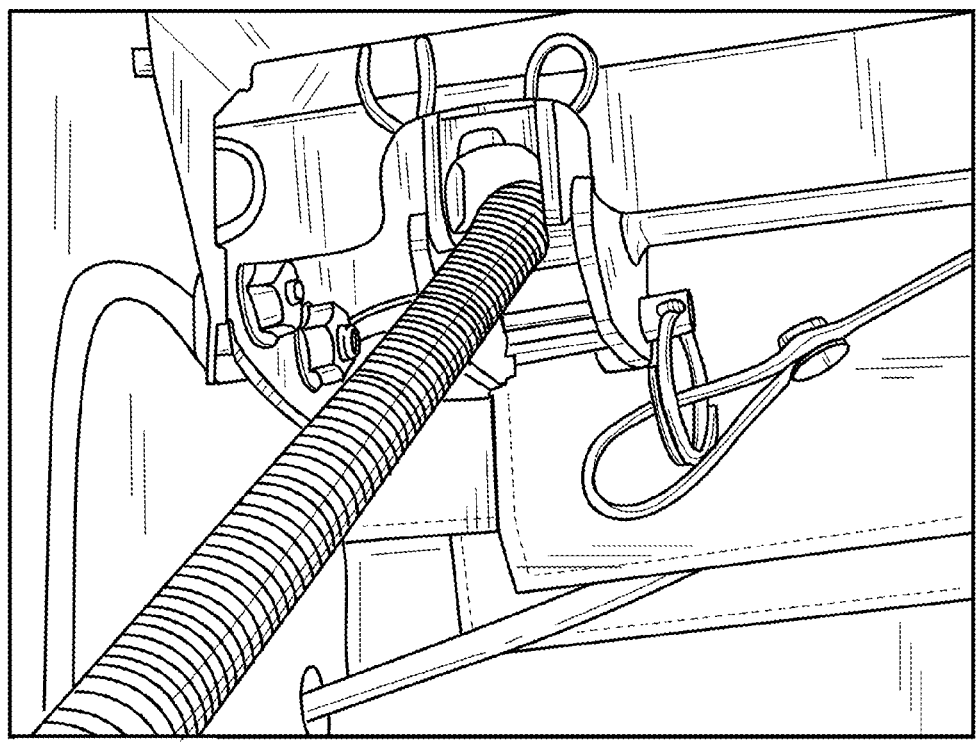
FIG. 15 is a close up view of the drive block lock assembly of an extendible sofa according to an embodiment of the present invention.

In the embodiment shown in FIGS. 11 and 15, the left and right drives 216 and 218 are connected to the left and right drive blocks 220 and 222. The seat motor moves the left and right drive blocks along left and right shafts 224 and 226 that extend upward and outward away from the left and right drives 216 and 218. When the left and right drive blocks 220 and 222 move to a position on the left and right drive shafts 224, 226 that is closest to the left and right drives 216 and 218, the seat assembly 300 is in the stowed position shown in FIG. 19. As the left and right drive blocks 220 and 222 move upward and outward along the left and right shafts 224, 226, the two front slidable connections 358 and two back slidable connections 322 move along the guides 230 until the seat assembly 300 is in the seat position shown in FIG. 20. In an embodiment, the left and right shafts may be left and right drive screws, as shown in FIGS. 13-15. In this case, the drive screws may be turned by the seat motor 214 to move the left and right drive blocks 220 and 222.

In an embodiment, the drive block lock assembly 356 removably locks the left and right drive blocks 220 and 222 to the drive block support assembly 350. Referring to FIGS. 11 and 15, the drive block lock assembly 356 may include left and right drive block locks 360 and left and right pins 362 (e.g., cotterless pins). Removing the left and right pins 362 opens the left and right drive block locks 360 so as to release the seat assembly 300 from the left and right drive blocks 220 and 222. A user may thus manually move the seat assembly 300 between the stowed and seat positions when the left and right pins 362 are removed. The drive block lock assembly 356 can also serve as a failure release allowing the end user to manually release the seat drives if, for example, power is lost or mechanical failure occurs.

In the embodiments discussed above with reference to FIGS. 7-11, a seat drive motor 218 was provided for moving the seat assembly 300 between the stowed and seat positions. In another embodiment, the seat motor 214, seat motor drive mount 212, right drive 216, left drive 218, right drive block 220, left drive block 222, right shaft 224 and left shaft may be omitted. In this embodiment, a user may manually move the seat assembly 300 along the guides 230 between the stowed and seat positions.

Figure 18:
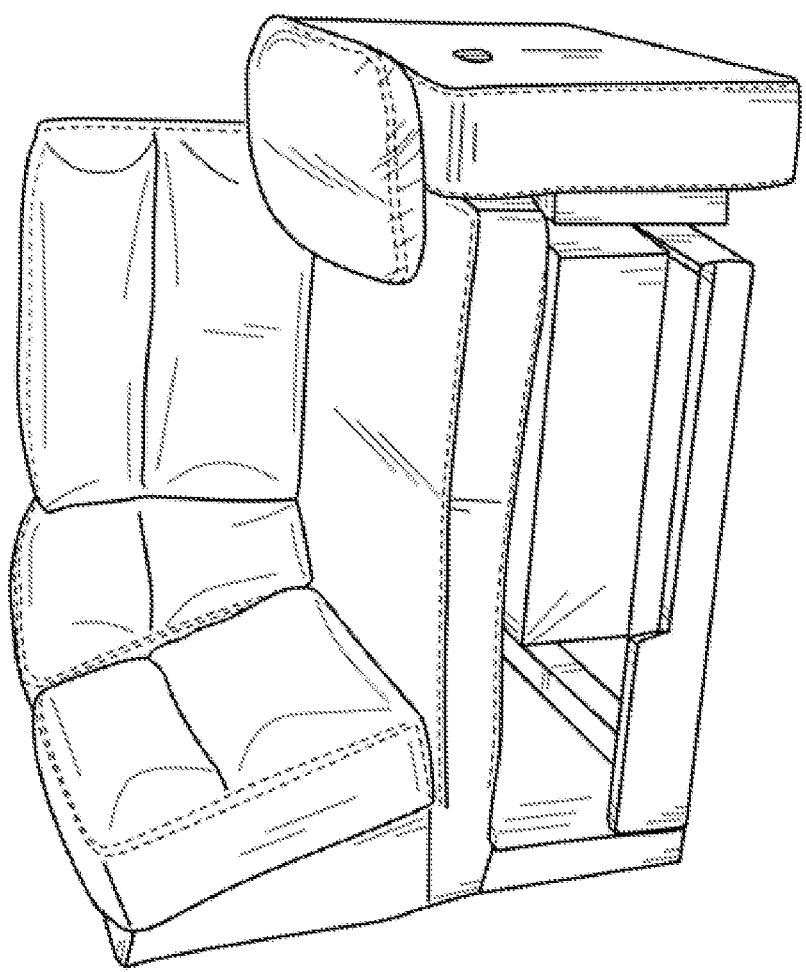
FIGS. 18-21 show an extendible sofa according to an embodiment of the present invention at different positions.
Figure 19:
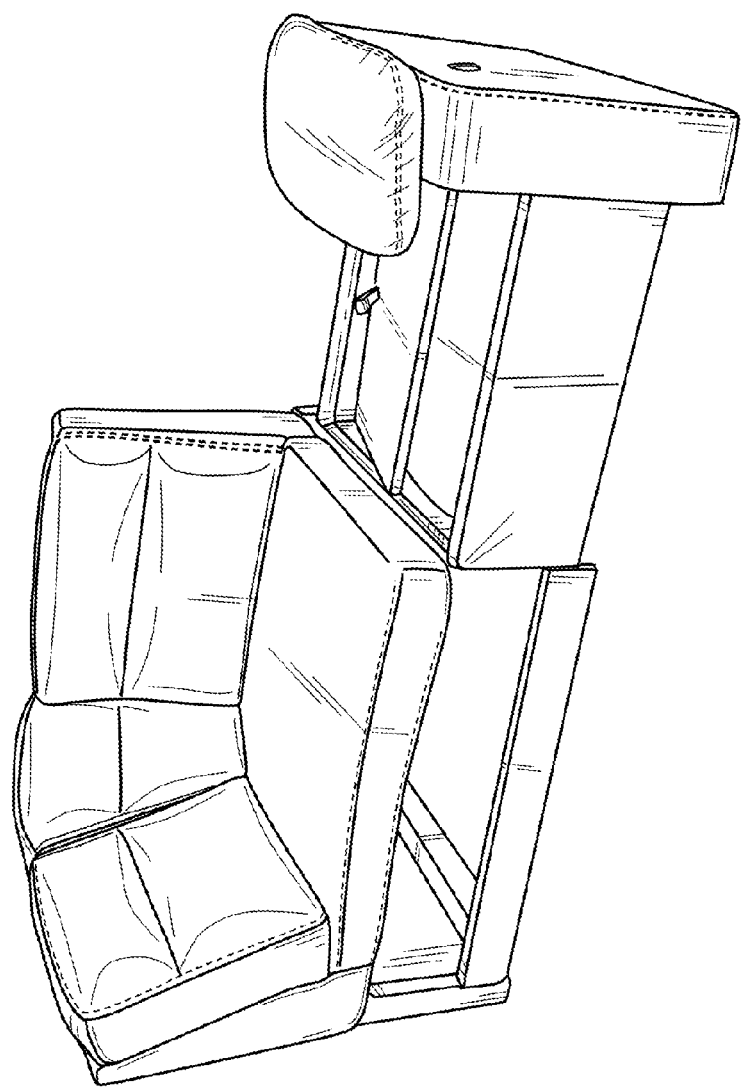

In an embodiment, the seat assembly further includes a seat back switch assembly 370 that cuts all power (e.g., power to the slide motor 38 and seat motor 214) when the seat back/back frame 320 is in the open/up position. Referring to FIGS. 9-11 and 18-19, the seat back switch assembly 370 may include a seat back switch (i.e., third switch) 372, a seat back switch support 374, a seat strap bracket 376, a back strap bracket 378, and a strap 380. The switch support 374 attaches to the seat link member 330 and an actuator 382 of the switch 372 protrudes through a hole in the switch support 374 (see FIGS. 9 and 19). The seat strap bracket 376 attaches to the switch support and includes a flange that extends over the actuator 382 and includes a groove for attaching one end of the strap 380. Back strap bracket 378 is attached to the back frame and includes a groove for attaching the other end of the strap 380. As shown in FIG. 18, the strap 380 is tight when the seat back/back frame 320 is in the closed/stowed position. When the strap 380 is tight the flange of the seat strap bracket pushes the actuator of switch 372. When the seat back/back frame 320 is placed in the open/up position, the strap is loose as shown in the bottom photo of FIG. 19. In this case, the actuator is released, which in turn opens the switch and cuts all power (e.g., power to the slide motor 38 and seat motor 214).

In an embodiment, the extendible sofa 1 includes all three of the switch assemblies 150, 240 and 370. These switches provide safety cutoffs that only allow the extendible sofa 1 to function when appropriate. As can be seen from the above description of the switch assemblies, the following safety cutoffs can be provided 1) when the slide out assembly is in the compact position=>slide out can function but the seat assembly 300 will not have power 2) the slide out assembly 300 is fully extended (i.e., the extended position) and the seat assembly 300 is in the stowed position=>the seat assembly 300 can move between the stowed and seat positions; 3) the seat assembly 300 is in any position other than the stowed position=>no power to the extension section; and 4) the seat back/back frame 320 is in the open/up position=>no power to any drive.

Figure 20:
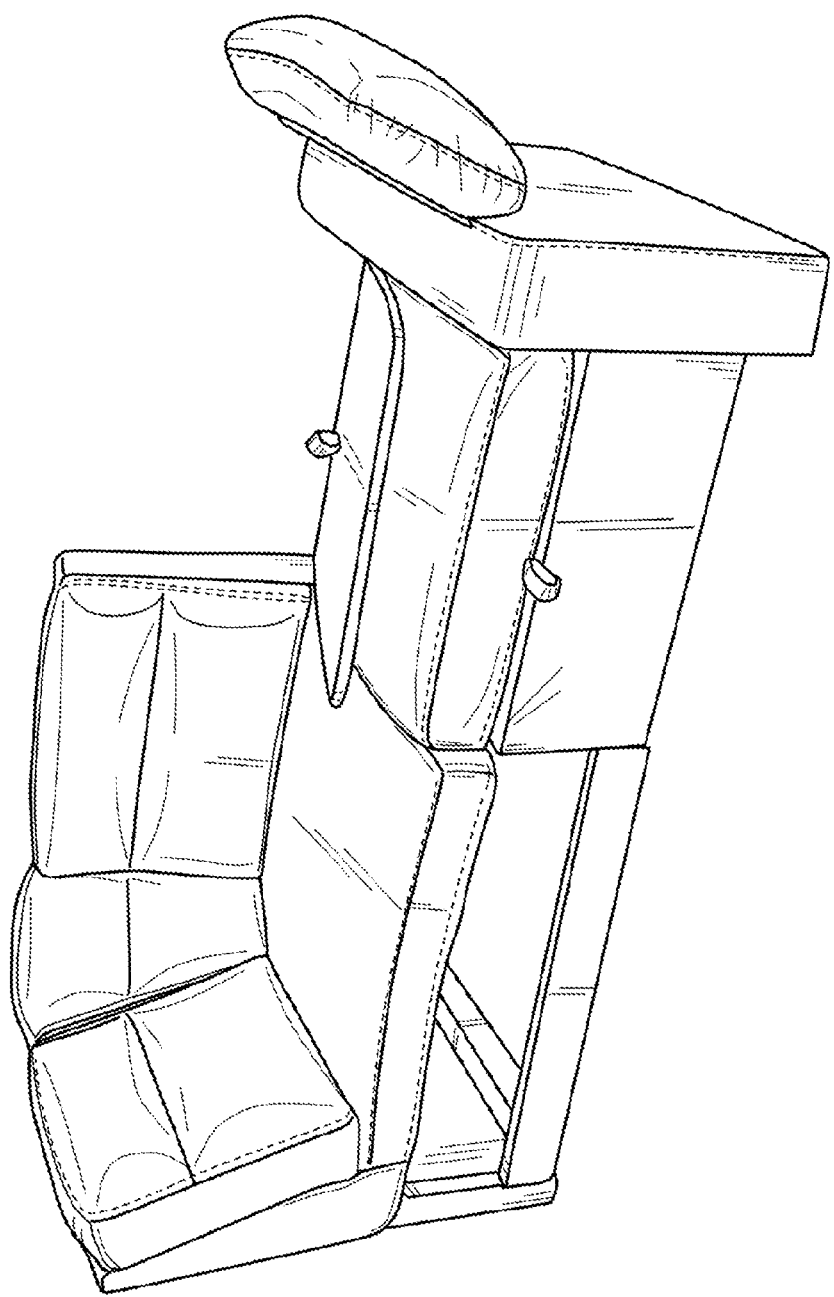
Figure 21:
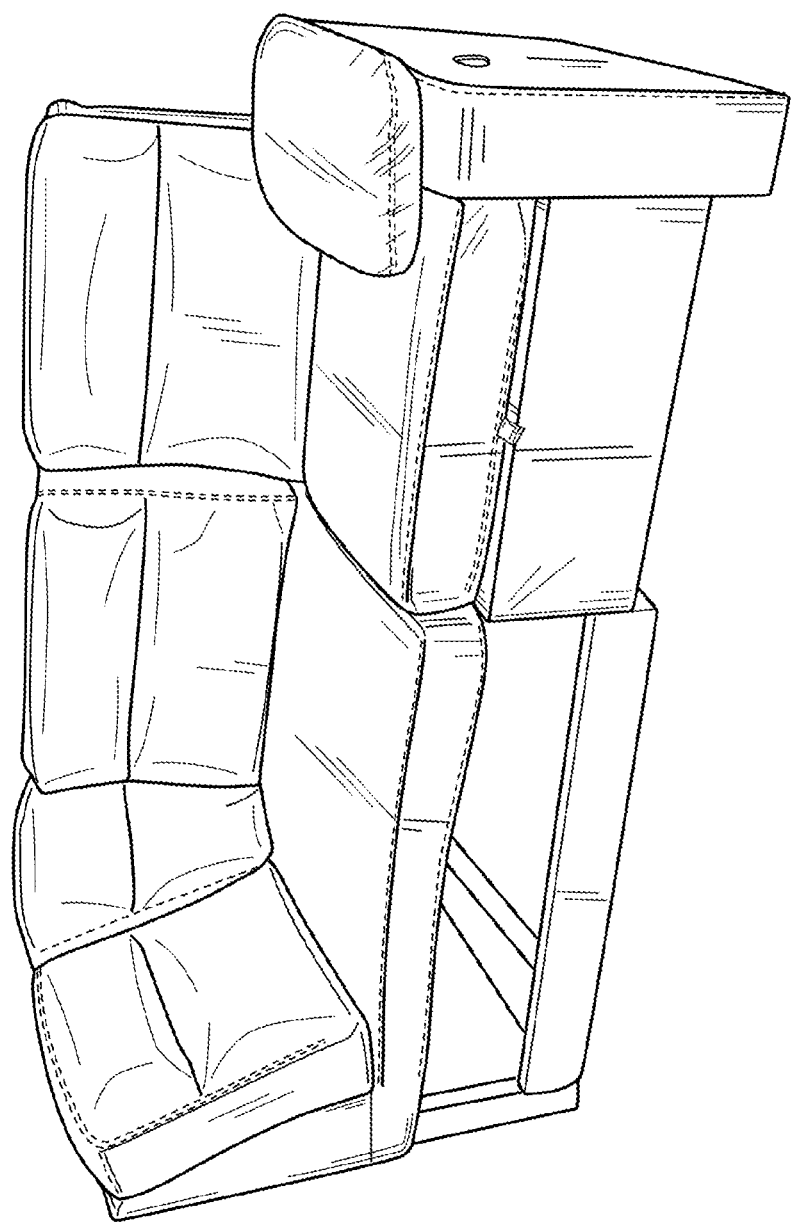

The extendible sofa may be upholstered by known upholstering methods to provide the upholstered extendible sofa shown in FIGS. 18-21. In an embodiment, the back cushion for the seat back/back frame 320 may be a loose back cushion that can be installed once the seat back is lifted to the open/up position. An example of this configuration is shown in FIGS. 20 and 21.

In an embodiment, two power buttons are added to the extendible sofa. One power button extends and retracts the slide out assembly 200, and the other powers seat motor 214 to move the seat assembly up and down (i.e., from the stowed position to the seat position). These power buttons may be placed at various positions on the extendible sofa or even in various positions in the RV or other spot where the sofa is housed, and may be placed at a position convenient to the user.

Various configurations of the extendible sofa may be provided without requiring new frames or materials. However, it should be noted that the invention is not limited to any of the particular configurations shown in this drawings, and one of ordinary skill in the art will understand that modifications can be provided without departing from the spirit and scope of the invention.

While certain embodiments of the applicator device have been described in detail with reference to the accompanying drawings, it should be apparent that modifications and variations thereto are possible, all of which fall within the true spirit and scope of the invention. The invention also includes all of the steps, features, compositions and compounds referred to or indicated in this specification, individually or collectively, and any and all combinations of any two or more of said steps or features.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other aspects of the invention, along with the various features of novelty that characterize the invention, are pointed out with particularity in the claims annexed to and forming a part of this disclosure. For a better understanding of the invention, its operating advantages and the specific aspects attained by its uses, reference should be had to the accompanying drawings and description matter in which there are illustrated preferred embodiments of the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:
1. An extendible sofa comprising:
a base assembly having a base assembly frame that forms a seat;
a slide out assembly comprising a slide out frame which is housed within the base assembly in a compact position, the slide out assembly being extendible to an extended position in which the slide-out assembly extends out away from the base assembly to provide additional seating, the slide-out assembly comprising a seat guide; and a seat assembly comprising a seat frame slidably connected to the seat guide, wherein the seat guide facilitates movement of the seat assembly between a stowed position in which the seat assembly is housed within the slide-out assembly and a seat position;

wherein the base assembly includes a slide out guide that facilitates movement of the slide-out assembly between the compact position in which the slide-out assembly is housed within the base assembly and the extended position in which the slide-out assembly extends out away from the base assembly to provide additional seating, and the slide out assembly is slidably connected to the base assembly by way of the slide out guide;

wherein the base assembly frame comprises:

a lower base frame comprising:
 two opposing longitudinal frame sections, at least one of the two opposing longitudinal frame sections having a sliding section in which the guide is formed, wherein the guide is a longitudinal groove that extends along the at least one of the two opposing longitudinal frame sections;
 two opposing side frame sections that connect the longitudinal frame sections to each other;
 an upper base frame connected to the lower base frame to form the seat;

wherein the base assembly further comprises:

a slide out drive motor that extends or contracts the slide out assembly in order to convert the slide out assembly from the compact position to the extended position or from the extended position to the compact position, the slide out drive motor comprising:
 a rear drive support attached to a rear one of the side frame sections;
 a front drive support attached to a front one of the side frame sections;
 a slide motor fastened to the rear drive support;
 a slide out shaft connected to the slide motor and extending longitudinally to the front drive support; and
 a drive block configured to slide along the slide out shaft, wherein the drive block is connected to the slide out assembly;
 wherein the slide motor moves the drive block along the slide-out shaft in order to move the slide-out assembly between the compact position and the extended position.

2. The extendible sofa of claim 1, wherein the drive block includes a hole formed in a surface thereof, and the extendible sofa further comprises:

a connection assembly for slidably connecting the slide out assembly to the base assembly, the connection assembly comprising:
 a connection frame attached to the slide out assembly;
 a drive lock assembly connecting the connection assembly to the drive block of the base assembly, the drive block assembly comprising a removable pin for inserting into a hole formed in the drive block.

3. The extendible sofa of claim 2, wherein the connection assembly further comprises:

a cable assembly attached to the connection frame for disengaging the connection assembly from the drive block, the cable assembly comprising:
a pin support to which the pin is connected;

a spring disposed between the pin support and the connection frame and surrounding the pin, wherein the spring biases the pin in a locked position; and a cable connected to the pin support, wherein upward movement of the cable forces the pin upwards to allow disengagement from the drive block.

4. The extendible sofa of claim 2, wherein the connection assembly further comprises:

a switch assembly comprising:
 a switch bracket attached to the connection assembly;
 a switch attached to the switch bracket, the switch having an actuator which faces the front side frame section,
wherein the actuator contacts the front side frame section when the slide out assembly reaches the extended position.

5. The extendible sofa of claim 1, wherein the slide-out assembly further comprises:

left and right side panels attached to the slide out frame, wherein the seat guide is formed in at least one of the left and right panels.

6. The extendible sofa of claim 1, wherein the slide-out assembly further comprises a seat switch assembly for preventing the slide out assembly from moving from the extended position to the compact position when the seat assembly is in the seat position, the seat switch assembly comprising:

a seat switch having an actuator; and a seat switch bracket mounted to the slide-out assembly, wherein the seat switch is positioned such that the actuator is pressed in by the seat assembly when the seat assembly is in the stowed position, and the actuator of the seat switch must be closed in order for the slide motor to operate.

7. An extendible sofa comprising:

a base assembly having a base assembly frame that forms a seat;

a slide out assembly comprising a slide out frame which is housed within the base assembly in a compact position, the slide out assembly being extendible to an extended position in which the slide-out assembly extends out away from the base assembly to provide additional seating, the slide-out assembly comprising a seat guide; and a seat assembly comprising a seat frame slidably connected to the seat guide, wherein the seat guide facilitates movement of the seat assembly between a stowed position in which the seat assembly is housed within the slide-out assembly and a seat position;

wherein the slide-out assembly further comprises:

left and right side panels attached to the slide out frame, wherein the seat guide is formed in at least one of the left and right panels;

a seat drive motor that moves the seat assembly along the seat guide between the stowed position and the seat position, the seat drive motor comprising:
 a seat motor mount fastened to the left and right side panels;
 a seat drive mounted to the seat motor mount;
 a seat motor mounted to the seat motor mount and powering the seat drive;
 a seat shaft connected to the seat drive; and
 a seat drive block connected to the seat, the seat drive block being configured to slide along the seat shaft, and
wherein the seat motor and seat drive move the seat drive block along the seat shaft between the stowed position and the seat position.

8. The extendible sofa of claim 7, wherein the seat assembly further comprises:
- a seat link member comprising:
  - a first arm connected to the seat frame;
  - a second arm connected to the seat guide; and
  - a pivot connection to which the back frame is pivotally connected; and
- a drive block support assembly attached to a front end of the seat and supporting the drive block.

9. The extendible sofa of claim 8, wherein the seat assembly further comprises:
- a seat back switch assembly for cutting power to the seat motor, the seat back switch assembly comprising:
  - a seat back switch support attached to the seat link members;
  - a seat back switch attached to the seat back switch support, the seat back switch having an actuator;
  - a seat strap bracket attached to the switch support and having a flange that extends over the actuator;
  - a back strap bracket attached to the back frame; and
  - a strap, wherein a first end of the strap is attached to the seat strap bracket and a second end of the strap is attached to the back strap bracket, and
  - wherein when the seat back frame is pivoted towards the seat frame, the strap is tight causing the seat strap bracket to push the actuator of the seat back switch, and when the seat back frame is pivoted away from the seat frame, the strap is loose releasing the actuator and thereby cutting power to the seat motor.

10. The extendible sofa of claim 7, wherein the drive block support assembly comprises a drive block lock assembly that removably locks the drive block to the drive block support assembly, the drive block lock assembly comprising:
- a drive block lock locking the drive block to the drive block support assembly; and
- a drive block pin holding the drive block lock in place so as to secure the seat assembly to the drive block.

11. An extendible sofa comprising:
- a base assembly comprising a base assembly frame, the base assembly frame comprising:
  - two opposing longitudinal frame sections, each of the two opposing longitudinal frame sections having a sliding section in which a longitudinal guide groove is formed, wherein the longitudinal guide grooves extend along the two opposing longitudinal frame sections; and
  - two opposing side frame sections that connect the longitudinal frame sections to each other;
- a slide-out assembly slidably connected to the base assembly by way of the longitudinal guide grooves, the slide out assembly comprising
  - a slide out frame; and
  - left and right side panels attached to the slide out frame, each of the left and right side panels including a pair of seat guides; and
- a seat assembly slidably connected to the pair of seat guides of the left and right side panels, wherein
- the longitudinal guide grooves facilitate movement of the slide-out assembly between a compact position in which the slide-out assembly is housed within the base assembly and an extended position in which the slide-out assembly extends out away from the base assembly to provide additional seating, and
- the pair of seat guides of the left and right side panels are sized and shaped to facilitate movement of the seat assembly between a stowed position in which the seat assembly is housed within the slide-out assembly and a seat position;
- the base assembly further comprises a slide out drive motor that extends or contracts the slide out assembly in order to convert the slide out assembly from the compact position to the extended position or from the extended position to the compact position, the motorized slide out mechanism; and
- the slide out assembly further comprises
  - a rear drive support attached to a rear one of the side frame sections;
  - a front drive support attached to a front one of the side frame sections;
  - a slide motor fastened to the rear drive support;
  - a slide out shaft connected to the slide motor and extending longitudinally to the front drive support; and
  - a drive block configured to slide along the slide out shaft, wherein the drive block is connected to the slide out assembly;
  - wherein the slide motor moves the drive block along the slide-out shaft in order to move the slide-out assembly between the compact position and the extended position.

12. The extendible sofa of claim 11, further comprising:
- a connection assembly for slidably connecting the slide out assembly to the base assembly, the connection assembly comprising:
- a connection frame attached to the slide out assembly, the connection frame including slidable fasteners for slidably connecting the connection frame to the longitudinal guide grooves of the base assembly frame.

13. An extendible sofa comprising:
- a base assembly comprising a base assembly frame, the base assembly frame comprising:
  - two opposing longitudinal frame sections, each of the two opposing longitudinal frame sections having a sliding section in which a longitudinal guide groove is formed, wherein the longitudinal guide grooves extend along the two opposing longitudinal frame sections; and
  - two opposing side frame sections that connect the longitudinal frame sections to each other;
- a slide-out assembly slidably connected to the base assembly by way of the longitudinal guide grooves, the slide out assembly comprising
  - a slide out frame; and
  - left and right side panels attached to the slide out frame, each of the left and right side panels including a pair of seat guides; and
- a seat assembly slidably connected to the pair of seat guides of the left and right side panels, wherein
- the longitudinal guide grooves facilitate movement of the slide-out assembly between a compact position in which the slide-out assembly is housed within the base assembly and an extended position in which the slide-out assembly extends out away from the base assembly to provide additional seating, and
- the pair of seat guides of the left and right side panels are sized and shaped to facilitate movement of the seat assembly between a stowed position in which the seat assembly is housed within the slide-out assembly and a seat position;
- wherein the seat assembly further comprises:
- two front slidable connections each connected to a front end guide of the pair of seat guides a seat frame;
a seat back frame; and
seat link members each comprising:
- a first arm connected to the seat frame;
- a second arm connected to a back end guide of the pair of seat guides; and
- a pivot connection to which the seat back frame is pivotally connected.

14. The extendible sofa of claim 13, wherein the slide out assembly further comprises:
- a seat drive motor that moves the seat assembly along the seat guide between the stowed position and the seat position, the seat drive motor comprising:
- a seat motor mount fastened to the left and right side panels;
- left and right seat drives mounted to the seat motor mount;
- a seat motor mounted to the seat motor mount and powering the left and right seat drives;
- left and right seat shafts connected to the left and right seat drives; and
- left and right seat drive blocks connected to the seat, the left and right seat drive blocks being configured to slide along the left and right seat shafts,
- wherein the seat assembly further comprises a drive block support assembly attached to a front end of the seat and supporting the left and right drive blocks, and
- wherein the seat motor and left and right seat drives move the left and right seat drive blocks along the left and right seat shafts between the stowed position and the seat position.

15. An extendible sofa comprising:
- a base assembly comprising a base assembly frame that forms a seat, the base assembly frame having a guide;
- a slide out assembly slidably connected to the base assembly by way of the guide, the slide-out assembly comprising a seat guide;
- a seat assembly slidably connected to the seat guide, the seat assembly comprising a seat frame,
- wherein the guide facilitates movement of the slide-out assembly between a compact position in which the slide-out assembly is housed within the base assembly and an extended position in which the slide-out assembly extends out away from the base assembly to provide additional seating, and
- wherein the seat guide facilitates movement of the seat assembly between a stowed position in which the seat assembly is housed within the slide-out assembly and a seat position,
- a slide out drive motor moving the slide out assembly along the longitudinal guide groove from the compact position to the extended position;
- a seat drive motor moving the seat assembly along the seat guide from the stowed position to the seat position;
- a first switch attached on the slide out assembly and configured to contact the base assembly for providing power to the seat drive motor when the slide-out assembly reaches the extended position;
- a second switch attached in the slide out assembly for preventing the slide out assembly from moving from the extended position to the compact position when the seat assembly is in the seat position; and
- a third switch attached in the seat assembly for cutting off power to the slide drive motor and the seat drive motor when the seat back frame is fully pivoted away from the seat frame.

* * * * *